United States Patent
Rajgadiya et al.

(10) Patent No.: US 12,379,505 B2
(45) Date of Patent: Aug. 5, 2025

(54) SYSTEMS AND TECHNIQUES FOR QUASI-ZENITH SATELLITE SYSTEM (QZSS) SIGNAL ACQUISITION

(71) Applicant: QUALCOMM Incorporated, San Diego, CA (US)

(72) Inventors: Pulkit Rajgadiya, Churu (IN); Fnu Siddhant, Bangalore (IN); Jordan Cookman, San Jose, CA (US); Mukesh Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/821,084

(22) Filed: Aug. 19, 2022

(65) Prior Publication Data

US 2024/0061128 A1   Feb. 22, 2024

(51) Int. Cl.
  *G01S 19/07*   (2010.01)
  *G01S 19/24*   (2010.01)
  *G01S 19/25*   (2010.01)

(52) U.S. Cl.
  CPC ............ *G01S 19/07* (2013.01); *G01S 19/243* (2013.01); *G01S 19/254* (2013.01); *G01S 19/256* (2013.01)

(58) Field of Classification Search
  CPC .......... G01S 19/07; G01S 19/30; G01S 19/04; G01S 19/243; G01S 19/254; G01S 19/256; G01S 19/31
  See application file for complete search history.

(56) References Cited

U.S. PATENT DOCUMENTS

| | | | | |
|---|---|---|---|---|
| 2010/0117884 A1* | 5/2010 | Ahmed | ............... | G01S 19/22 342/14 |
| 2020/0136673 A1* | 4/2020 | Brown | ............... | H04B 1/709 |
| 2021/0405210 A1* | 12/2021 | Zangvil | ............... | G01S 19/215 |
| 2022/0179098 A1* | 6/2022 | Cheng | ............... | G01S 19/32 |

FOREIGN PATENT DOCUMENTS

JP        2019074436 A   *   5/2019

OTHER PUBLICATIONS

International Search Report and Written Opinion—PCT/US2023/069422—ISA/EPO—Oct. 27, 2023.

* cited by examiner

*Primary Examiner* — Peter M Bythrow
(74) *Attorney, Agent, or Firm* — Polsinelli LLP

(57) ABSTRACT

Systems and techniques are provided for performing Quasi-Zenith Satellite System (QZSS) signal acquisition. For example, an example of a method for performing QZSS signal acquisition includes obtaining a modulated message signal using a frequency band and generating, based on an estimated set of signal acquisition parameters associated with an acquired signal, an energy grid of correlation codes. A series of extracted data bytes can be generated for each respective hypothesis of a plurality of hypotheses, based on a location of a peak energy within the energy grid of correlation codes. A correct hypothesis out of the plurality of hypotheses can be determined, wherein the correct hypothesis is associated with a generated series of extracted data bytes that includes a pre-determined header preamble pattern. The modulated message signal can be decoded using an initial code phase associated with the correct hypothesis.

30 Claims, 11 Drawing Sheets

SYSTEMS AND TECHNIQUES FOR QUASI-ZENITH SATELLITE SYSTEM (QZSS) SIGNAL ACQUISITION

FIELD

The present disclosure generally relates to positioning of devices. For example, aspects of the present disclosure are related to Quasi-Zenith Satellite System (QZSS) signal acquisition.

BACKGROUND

Electronic devices can include systems that determine a location of the electronic device based at least in part on signals received from a Global Navigation Satellite System (GNSS). Examples of GNSS systems include the Global Positioning System (GPS); the Global Orbiting Navigation Satellite System (GLONASS); the BeiDou Navigation Satellite System (BDS); and Galileo. GNSS receivers can be integrated into mobile electronic devices, such as smartphones or smartwatches, as well as into navigation systems in different types of vehicles, including cars, trucks, ships, and aircraft. GNSS signals are received by GNSS receivers from multiple satellites orbiting the Earth and processed to determine the GNSS receiver's location and, by proxy, the location of the device, vehicle, etc. GNSS signals can additionally be processed to determine other information such as speed, heading, altitude, etc.

A GNSS satellite can be capable of transmitting multiple types of GNSS signals, each of which is transmitted over a respective band. A GNSS receiver may be designed to receive two or more types of GNSS signals. In some cases, a GNSS receiver may process the received two or more types of GNSS signals separately, such as during the acquisition, tracking and decoding stages. In some examples, the two or more types of GNSS signals can include a GNSS signal and a GNSS augmentation signal. A GNSS augmentation signal can be transmitted by a GNSS augmentation system, which may be used to improve the performance of GNSS-based positioning and location estimation. For example, the Quasi-Zenith Satellite System (QZSS) is a satellite-based augmentation system (SBAS) that can be used to improve the performance of GPS-based positioning and location estimation.

BRIEF SUMMARY

In some examples, systems and techniques are described for Quasi-Zenith Satellite System (QZSS) signal acquisition. For example, QZSS signal acquisition can be performed based on a GPS L1 signal that is detected for the same target space vehicle identifier (SVID) as the QZSS L62 signal.

According to at least one illustrative example, a method of performing Quasi-Zenith Satellite System (QZSS) signal acquisition is provided. The method includes: obtaining a modulated message signal using a frequency band; generating, based on an estimated set of signal acquisition parameters associated with an acquired signal, an energy grid of correlation codes; generating a series of extracted data bytes for each respective hypothesis of a plurality of hypotheses, the plurality of hypotheses generated based on a location of a peak energy within the energy grid of correlation codes; determining a correct hypothesis out of the plurality of hypotheses, wherein the correct hypothesis is associated with a generated series of extracted data bytes that includes a pre-determined header preamble pattern; and decoding the modulated message signal using an initial code phase associated with the correct hypothesis.

In another illustrative example, an apparatus is provided for performing QZSS signal acquisition. The apparatus includes at least one memory and at least one processor (e.g., configured in circuitry) coupled to the at least one memory. The at least one processor is configured to and can: obtain a modulated message signal using a frequency band; generate, based on an estimated set of signal acquisition parameters associated with an acquired signal, an energy grid of correlation codes; generate a series of extracted data bytes for each respective hypothesis of a plurality of hypotheses, the plurality of hypotheses generated based on a location of a peak energy within the energy grid of correlation codes; determine a correct hypothesis out of the plurality of hypotheses, wherein the correct hypothesis is associated with a generated series of extracted data bytes that includes a pre-determined header preamble pattern; and decode the modulated message signal using an initial code phase associated with the correct hypothesis.

In another illustrative example, at least one non-transitory computer-readable medium is provided having instructions which, when executed by one or more processors, cause the one or more processors to: obtain a modulated message signal using a frequency band; generate, based on an estimated set of signal acquisition parameters associated with an acquired signal, an energy grid of correlation codes; generate a series of extracted data bytes for each respective hypothesis of a plurality of hypotheses, the plurality of hypotheses generated based on a location of a peak energy within the energy grid of correlation codes; determine a correct hypothesis out of the plurality of hypotheses, wherein the correct hypothesis is associated with a generated series of extracted data bytes that includes a pre-determined header preamble pattern; and decode the modulated message signal using an initial code phase associated with the correct hypothesis.

In another illustrative example, an apparatus is provided including: means for obtaining a modulated message signal using a frequency band; means for generating, based on an estimated set of signal acquisition parameters associated with an acquired signal, an energy grid of correlation codes; means for generating a series of extracted data bytes for each respective hypothesis of a plurality of hypotheses, the plurality of hypotheses generated based on a location of a peak energy within the energy grid of correlation codes; means for determining a correct hypothesis out of the plurality of hypotheses, wherein the correct hypothesis is associated with a generated series of extracted data bytes that includes a pre-determined header preamble pattern; and means for decoding the modulated message signal using an initial code phase associated with the correct hypothesis.

In some aspects, the apparatus is, is part of, and/or includes a UE, such as a wearable device, an extended reality (XR) device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
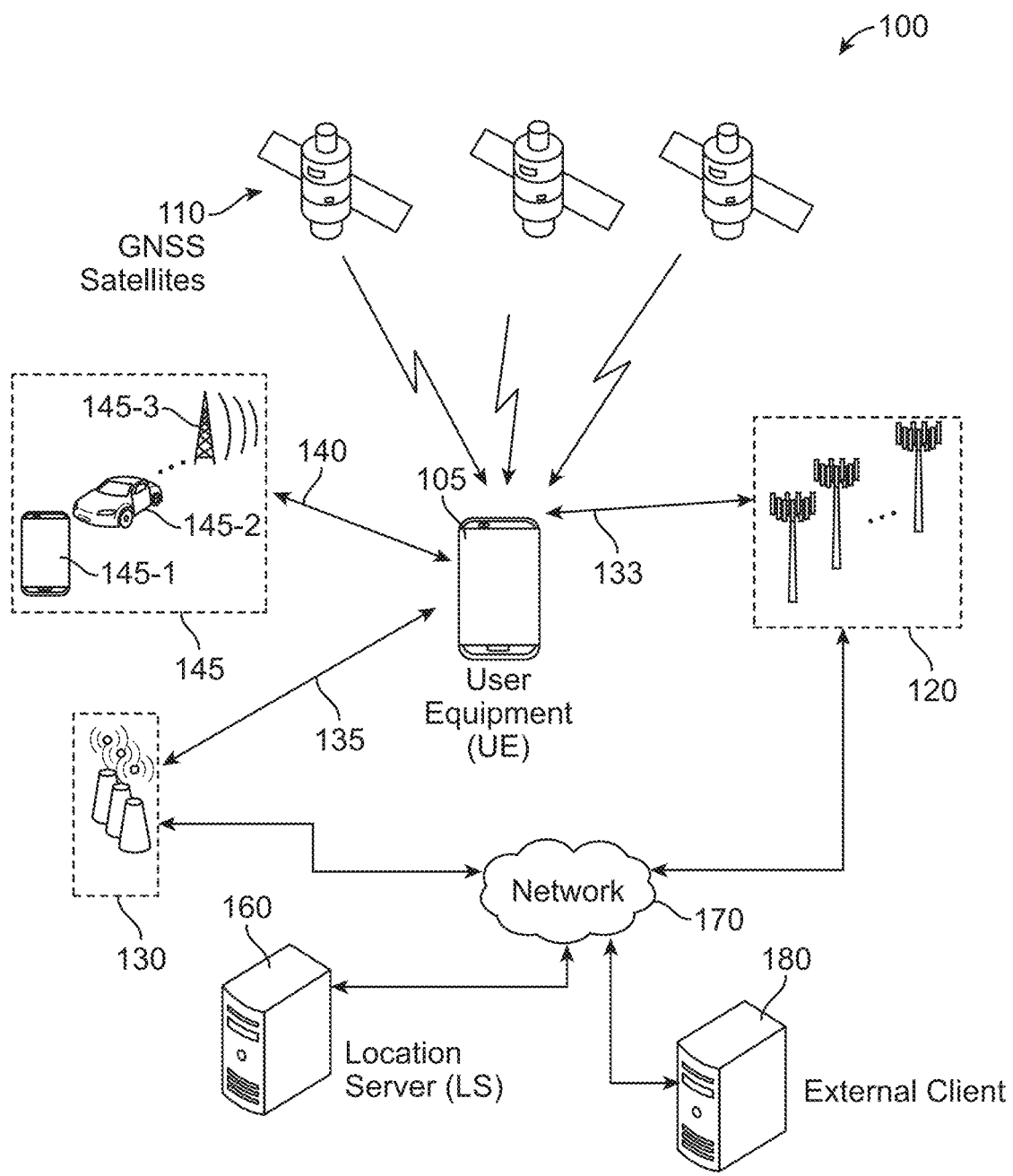
FIG. 1 is a graph illustrating an example global navigation satellite system (GNSS) positioning system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The Quasi-Zenith Satellite System (QZSS) is a satellite-based augmentation system (SBAS) that has been developed by the Japanese government to enhance Global Positioning System (GPS) signal coverage and performance. For example, QZSS can utilize satellites that are in quasi-zenith orbits (QZO) and/or geostationary orbits (GEO) to provide positioning signals. Based on analyzing and/or comparing multiple positioning signals received from different satellites, ground-based receivers (e.g., UEs and other devices) can determine their own position based on the positioning signals.

QZSS has been operated as a four-satellite constellation since 2018, with a design goal of having three satellites visible at all times from locations in the Asia-Oceania region. QZSS may be expanded to provide a seven-satellite (or larger) constellation. QZSS can be used in an integrated manner with existing GPS satellites and receivers. In some cases, QZSS can use or otherwise implement spectral properties that are equivalent to those of GPS, such that QZSS and GPS achieve the highest level of interoperability among all the satellite navigation systems. For example, a UE or other device can receive positioning signals from the QZSS satellites and from one or more GPS satellites. The combination of positioning signals received from QZSS satellites and GPS satellites can increase the total number of positioning signals (e.g., and therefore stability and/or precision) with which the UE calculates its position.

QZSS introduced additional signals on the L6 frequency band—an L61 signal and an L62 signal. The L61 and L62 signals can be used to provide the QZSS implementation of centimeter-level augmentation (CLAS). For example, the L61 signal structure includes a data signal and pilot signal. The L61 data signal can be used to obtain QZSS positioning information. The pilot signal can be used to acquire the L61 signal (e.g., can be used to perform signal acquisition for the L61 signal).

QZSS specifies an L62 signal structure that includes only a data signal, and lacks a pilot signal (e.g., which could be used to perform acquisition of the L62 signal, if present). The L62 data signal is Code Shift Keying (CSK) modulated (e.g., modulated on a reference pseudorandom noise (PRN) code). In some cases, the L62 signal is the only signal in the QZSS system that utilizes CSK modulated data without also including an associated pilot signal.

A pilot signal (e.g., also referred to as a "pilot code" or "pilot information") is used to improve the accuracy and reliability of signal acquisition. In some cases, by including a pilot signal for only the QZSS L61 signal (e.g., and not including a pilot signal for the L62 QZSS signal), QZSS may be seen to provide an efficiency increase at the expense of signal acquisition difficulty. For example, it can be challenging to acquire a CSK modulated signal (e.g., such as the L62 QZSS signal) without an associated pilot signal that may be used to provide synchronization. There is a need for systems and techniques that can be used to acquire the QZSS L62 signal and decode the CSK modulated data, without using a pilot signal (e.g., which the QZSS L62 signal lacks).

Systems, apparatuses, processes (also referred to as methods), and computer-readable media (collectively referred to as "systems and techniques") are described herein for Quasi-Zenith Satellite System (QZSS) signal acquisition. For example, QZSS signal acquisition can be performed based on a GPS L1 signal that is detected for the same target space vehicle identifier (SVID) as the QZSS L62 signal. The acquisition parameters of the GPS L1 signal can be determined for the L1 band or otherwise obtained in the L1 band. The GPS L1 signal acquisition parameters can be steered to the L6 band (e.g., the L6 band associated with the QZSS L62 signal that is the desired acquisition target). For example, the GPS L1 signal acquisition parameters can include a Doppler frequency and an initial code phase. The GPS L1 Doppler frequency can be steered to the L6 band to generate an estimate Doppler frequency for acquiring the QZSS L62 signal on the L6 band. Similarly, the GPS L1 initial code phase can be steered to the L6 band to generate an estimate initial code phase for acquiring the QZSS L62 signal om the L6 band.

In some aspects, Doppler estimation can be improved by performing a fine scan on the L6 band. For example, the Doppler estimation can be refined based on generating an energy grid for an initial portion of L62 signal (e.g., a 4 ms portion). Subsequently, hypothesis-based preamble detection can be performed for improved code phase estimation for acquiring the QZSS L62 signal and decoding a CSK modulated message associated with or otherwise included in the QZSS L62 signal.

In some examples, the QZSS L62 signal can be directly acquired on the L6 band. For example, one of the two data signal components included in the QZSS L62 signal may be directly acquired on the L62 band. After directly acquiring at least one of the two data signal components included in the QZSS L62 signal, Doppler estimation can be improved by performing a fine scan on the L6 band and hypothesis-based preamble detection can be performed for improved code phase estimation.

In some aspects, the Doppler estimation and hypothesis-based preamble detection for code phase estimation can be used to generate fine-tuned parameters for QZSS L62 signal acquisition. The fine-tuned signal acquisition parameters can be used to perform signal acquisition for the full QZSS L62 signal and/or to perform data decoding for the acquired QZSS L62 signal.

Further details regarding the systems and techniques described herein will be discussed below with respect to the figures.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 is a simplified illustration of a positioning system 100. The positioning system 100 can include a UE 105, one or more GNSS satellites 110 associated with a GNSS (e.g., such as GPS), base stations 120, access points (APs) 130, location server (LS) 160, network 170, and an external client 180. In some examples, a GNSS satellite can also be referred to as a satellite vehicle (SV). Generally put, the positioning system 100 can estimate a location of the UE 105 based on radio frequency (RF) signals received by and/or sent from the UE 105 and known locations of other components (e.g., GNSS satellites 110, base stations 120, APs 130) transmitting and/or receiving the RF signals.

In this example, FIG. 1 illustrates the UE 105 as a smartphone device, however, UEs may be any suitable device that includes GNSS capabilities or may be a device or machine into which such GNSS capabilities are integrated. Thus, a UE 105 may include personal devices such as a smartphone, smartwatch, tablet, laptop, etc. However, UEs may include a larger class of device as well and may include vehicles with integrated GNSS receivers and positioning systems, such as boats or ships, cars, trucks, aircraft, shipping containers, etc.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a WLAN, a WWAN, and/or the Internet, for example. Particular examples of network 170 include a Long Term Evolution (LTE) wireless network, a Fifth Generation (5G) wireless network (also referred to as New Radio (NR) wireless network), a Wi-Fi wireless local area network (WLAN) and the Internet. LTE, 5G and NR are wireless technologies defined, or being defined, by the 3rd Generation Partnership Project (3GPP). Network 170 may also include more than one network and/or more than one type of network.

The base stations (BS) 120 and access points (APs) 130 are communicatively coupled to the network 170. In some embodiments, the base station 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth AP, for example. Thus, UE 105 can send and receive information with network-connected devices, such as LS 160, by accessing the network 170 via a base station 120 using a first communication link 133. Additionally, or alternatively, because APs 130 also may be communicatively coupled with the network 170, UE 105 may communicate with Internet-connected devices, including LS 160, using a second communication link 135.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for 5G or NR radio access by UE 105. In a CP location solution, signaling to control and manage the location of UE 105 may be exchanged between elements of network 170 and with UE 105 using existing network interfaces and protocols and as signaling from the perspective of network 170. In a UE location solution, signaling to control and manage the location of UE 105 may be exchanged between LS 160 and UE 105 as data (e.g., data transported using the Internet Protocol (IP) and/or Transmission Control Protocol (TCP)) from the perspective of network 170.

As previously noted, the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. As illustrated, other UEs may include, for example, a mobile phone 145-1, vehicle 145-2, and/or static communication/positioning device 145-3. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

In some examples, such as when the UE 105 comprises and/or is incorporated into a vehicle, a form of D2D communication used by the UE 105 may include vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond with a component or device on a vehicle, RSU, or other V2X entity that is used to communicate V2X messages. The static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that UEs 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g., to assist direction finding or navigation for a user of UE 105 or to assist another user (e.g., associated with external client 180) to locate UE 105. A "location" is also referred to herein as a "location estimate", "estimated location", "location", "position", "position estimate", "position fix", "estimated position", "location fix" or "fix". A location of UE 105 can be an absolute location of UE 105 (e.g., a latitude and longitude and possibly altitude) or a relative location of UE 105 (e.g., a location expressed as distances north or south, east or west and possibly above or below some other known fixed location or some other location such as a location for UE 105 at some known previous time). A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., 95% confidence).

The external client 180 may be a web server or remote application that may have some association with UE 105 (e.g., may be accessed by a user of UE 105) or may be a server, application, or computer system providing a location service to some other user or users which may include obtaining and providing the location of UE 105 (e.g., to enable a service such as friend or relative finder, asset tracking or child or pet location). Additionally, or alternatively, the external client 180 may obtain and provide the location of UE 105 to an emergency services provider, government agency, etc.

Figure 2:
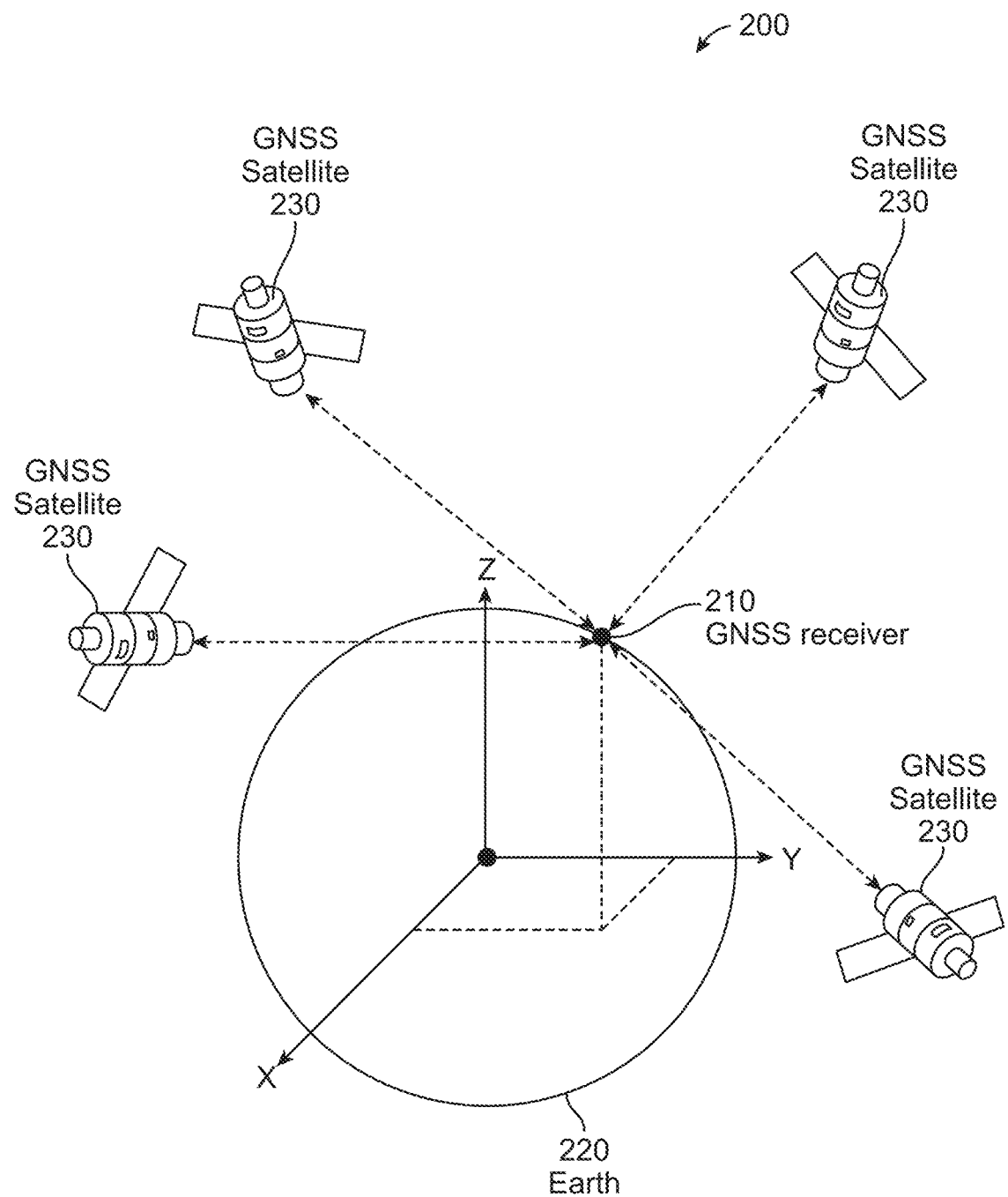
FIG. 2 is a diagram of a simplified example GNSS system, in accordance with some examples.

As illustrated in FIG. 1, the position of UE 105 may be determined in a variety of ways. Moreover, a positioning engine (e.g., Kalman filter) executed by the user equipment 105 may use position estimates from one or more of a variety of sources (GNSS, RAT-based positioning, etc.) to determine a final estimated location for the UE 105. FIG. 2 and the corresponding description below provide additional detail regarding how the position of a GNSS receiver of the UE 105 may be determined.

FIG. 2 is a simplified diagram of a GNSS system 200, provided to illustrate how GNSS is generally used to determine an accurate location of a GNSS receiver 210 on earth 220. As previously noted, a GNSS receiver 210 may be incorporated into a UE 105 or similar mobile device, and GNSS positioning may be one of a plurality of positioning techniques that may be employed to determine the location of the UE/mobile device. Put generally, the GNSS system 200 enables an accurate GNSS position fix of the GNSS receiver 210, which receives radio RF signals from GNSS satellites 230 from one or more GNSS constellations. (GNSS satellites 230 of FIG. 2 may correspond with GNSS satellites 110 of FIG. 1.)

It will be understood that the diagram provided in FIG. 2 is greatly simplified. In practice, there may be dozens of satellites 230 and a given GNSS constellation, and there are many different types of GNSS systems. GNSS systems include, for example, GPS, Galileo, GLONASS, and BDS, as noted. Additionally, GNSS systems may include Quasi-Zenith Satellite System (QZSS) over Japan, Indian Regional Navigational Satellite System (IRNSS) over India, and/or the like. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., QZSS, Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration, which is a method of determining position by measuring distances to points at known coordinates. In general, the determination of the position of a GNSS receiver 210 in three dimensions may rely on a determination of the distance between the GNSS receiver 210 and four or more satellites 230. As illustrated, 3D coordinates may be based on a coordinate system (e.g., cartesian coordinates represented by X,Y,Z values; geographic coordinates represented by latitude, longitude, and altitude values; etc.) centered at the earth's center of mass. A distance between each satellite 230 and the GNSS receiver 210 may be determined using precise measurements made by the GNSS receiver 210 of a difference in time from when a radio frequency RF signal is transmitted from the respective satellite 230 and when it is received at the GNSS receiver 210. To help ensure accuracy, not only does the GNSS receiver 210 need to make an accurate determination of when the respective signal from each satellite 230 is received, but many additional factors need to be considered and accounted for. These factors include, for example, clock differences at the GNSS receiver 210 and satellite 230 (e.g., clock bias), a precise location of each satellite 230 at the time of transmission (e.g., as determined by the broadcast ephemeris), the impact of atmospheric distortion (e.g., ionospheric and tropospheric delays), and the like.

To perform a traditional GNSS position fix, the GNSS receiver 210 can use code-based positioning to determine its distance to each satellite 230 based on a determined delay in a generated pseudorandom binary sequence received in the RF signals received from each satellite, in consideration of the additional factors and error sources previously noted. With the distance and location information of the satellites 230, the GNSS receiver 210 can then determine a position fix for its location. This position fix may be determined, for example, by a Standalone Positioning Engine (SPE) executed by one or more processors of the GNSS receiver 210. However, code-based positioning can be relatively inaccurate and, without error correction, is subject to many of the previously described errors. In some cases, code-based GNSS positioning can provide a positioning accuracy for the GNSS receiver 210 on the order of meters.

More accurate carrier-based ranging can be performed based on a carrier wave of the RF signals from satellites and may use measurements at a base or reference station (not shown) to perform error correction to help reduce errors from the previously noted error sources. More specifically, errors (e.g., atmospheric errors sources) in the carrier-based ranging of satellites 230 observed by the GNSS receiver 210 can be mitigated or canceled based on similar carrier-based ranging of the satellites 230 using a highly accurate GNSS receiver at the base station at a known location. These measurements and the base station's location can be provided to the GNSS receiver 210 for error correction. This position fix may be determined, for example, by a Precise Positioning Engine (PPE) executed by one or more processors of the GNSS receiver 210. More specifically, in addition to the information provided to an SPE, the PPE may use base station GNSS measurement information, and additional correction information, such as precise orbit and/or clock information, troposphere and ionosphere (e.g., information of the atmospheric layers through which the GNSS signal physically propagates from satellite to receiver), to provide a high accuracy, carrier-based position fix. Several GNSS techniques can be adopted in PPE, such as Differential GNSS (DGNSS), Real-time kinematic (RTK) positioning, and Precise Point Positioning (PPP), and may provide a sub-meter accuracy (e.g., on the order of centimeters).

Figure 3:
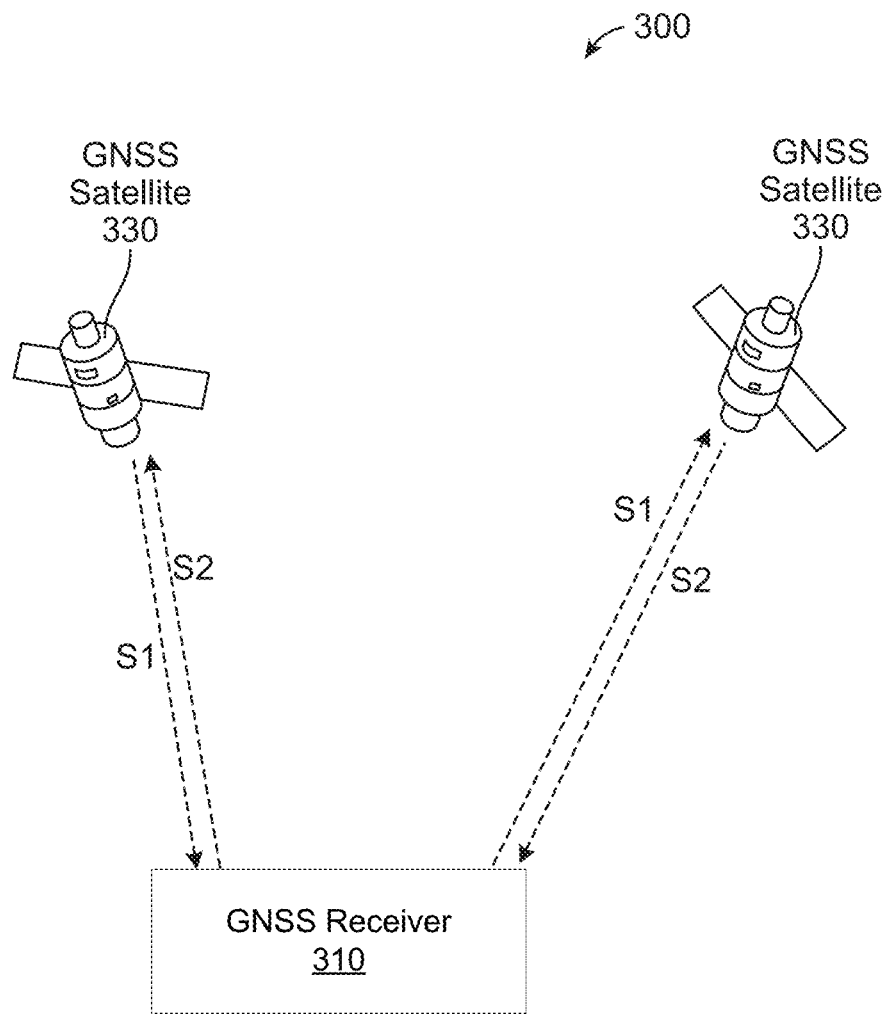
FIG. 3 is a diagram of a simplified example GNSS system, in accordance with some examples.

FIG. 3 illustrates an example GNSS system 300, which in some examples can be the same as or similar to the GNSS system 200 described above with respect to FIG. 2. GNSS system 300 can include multiple GNSS satellites 330. Each of the GNSS satellites 330 may be able to transmit two or more types of GNSS signals simultaneously, such as Signal S1 and Signal S2. Once transmitted by the GNSS satellites 330, Signal S1 and Signal S2 may propagate (e.g., travel) through free space in the direction of transmission. Subsequently, Signal S1 and Signal S2 may be received by receiver 310. Receiver 310 could be located, for example, on the ground. In some examples, receiver 310 can include a UE and/or can be the same as or similar to receiver 210 (e.g., described above with respect to FIG. 2).

In some aspects, as satellite signals of GNSS system 300, one or more (or both) of Signal S1 and Signal S2 can be direct sequence spread spectrum (DSSS) signals. PRN (pseudo random noise) codes can be modulated in the DSSS signals. In some cases, Signal S1 and Signal S2 may adopt different signal structures. For example, different PRN codes with different code lengths could be adopted for Signal S1 and Signal S2. In some cases, different modulation schemes may be adopted. For example, Signal S1 may adopt an exclusive-or operation (module-2 addition) in modulating a PRN code, while Signal S2 may adopt a Code Shift Keying (CSK) modulation scheme.

Signal S1 and Signal S2 may be transmitted in different bands and provide different services (e.g., to receiver 310 or a UE including or associated with receiver 310). For example, Signal S1 may be transmitted on a first GNSS operational band, while Signal S2 may be transmitted on a second GNSS operational band that is different from the first GNSS operational band. In some cases, Signal S1 and Signal S2 that are transmitted by a same satellite (e.g., one of the GNSS satellites 330) may be synchronized with each other before transmission, because the generation of Signal S1 and the generation of Signal S2 may use a common atomic clock on the satellite. For example, Signal S1 and Signal S2 transmitted by a GNSS satellite 330 may be synchronized with each other. The synchronization between Signal S1 and Signal S2 of the same GNSS satellite 330 can allow receiver 310 to jointly process the two signals and/or use one signal to process another signal.

In some examples, receiver 310 can process received Signal S1 and Signal S2 to determine position, navigation and/or timing (PNT) information associated with receiver 310. For example, receiver 310 may acquire, track and decode a plurality of Signals S1 that are transmitted by a plurality of GNSS satellites 330. The measurements gathered during tracking and the messages decoded from Signals S1 can be used to calculate the PNT information. In some cases, measurements gathered during tracking of Signal S1 may be used for decoding of Signal S2, as will be described in greater depth below.

Signal S1 and Signal S2 can be any two types of GNSS signals that may be simultaneously transmitted by the same satellite of a GNSS. In one illustrative example, Signal S1 and Signal S2 can be QZSS signals transmitted by or otherwise associated with the Quasi-Zenith Satellite System (QZSS). For example, Table 1 below depicts example parameters of various QZSS signals, and in some aspects, one or more (or both) of Signal S1 and Signal S2 can be selected from the listed signals.

TABLE 1

QZSS signals and associated parameters.

| GNSS operational band | Nominal carrier frequency | Signal Name | PRN Code Modulation Scheme | Service Name |
|---|---|---|---|---|
| L1 | 1575.42 MHz | L1C/A | module-2 addition | C/A |
|  |  | L1C | module-2 addition | L1CP |
|  |  |  | module-2 addition | L1CD |
| L2 | 1227.60 MHz | L2C | module-2 addition | L2CL |
|  |  |  |  | L2CM |
| L5 | 1176.45 MHz | L5 | module-2 addition | 15 |
|  |  |  |  | Q5 |
| L6 | 1278.75 MHz | L61 | CSK | CLAS |
|  |  | L62 |  |  |

In some cases, Signal S1 may be any of signals transmitted on the L1, L2, or L5 bands (also referred to as "L1 signal", "L2 signal" or "L5 signal" respectively). The L1 signal can include an L1C/A signal or an L1C signal, and the L1C signal may be a signal used for an L1 CP service or an L1CD service. The L2 signal includes an L2C signal that may be a signal used for an L2CL service or an L2CM service. The L5 signal may be a signal used for the 15 service or the Q5 service. The signal structures of the L1, L2 or L5 signal is specified in an interface specification document (ICD) of QZSS.

In some examples, Signal S2 can be a signal transmitted on the L6 band (also referred as "L6 signal"). The L6 signal may include an L61 signal and/or an L62 signal, as will be described in greater depth below with respect to FIG. 4A (e.g., depicting an example QZSS L61 message structure) and FIG. 4B (e.g., depicting an example QZSS L62 message structure). In some aspects, the QZSS L6 signal can be used to provide or implement a Centimeter-Level Augmentation Service (CLAS), and in some cases may also be referred to as a CLAS signal.

In some aspects, when modulating a PRN code with a navigation message, the QZSS L6 signal adopts a CSK modulation scheme rather than a conventional module-2 addition operation. In generating conventional GNSS signals (e.g., such as L1, L2 or L5 signals), a module-2 addition operation is performed on a navigation message and a PRN code so as to modulate the navigation message and the PRN code together. The CSK modulation shifts the phase of the PRN code by a number of code chips that is indicated by the navigation message.

Figure 4A:
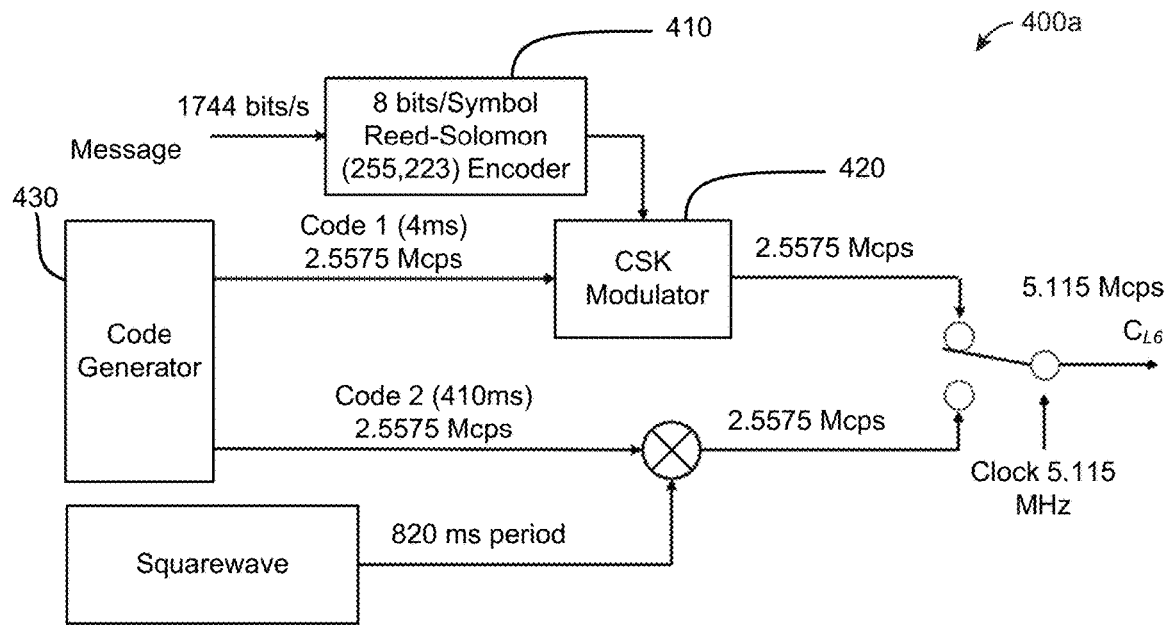
FIG. 4A illustrates an example L61 signal structure associated with the Quasi-Zenith Satellite System (QZSS), in accordance with some examples.

FIG. 4A is a diagram illustrating an example QZSS L61 signal structure 400a and associated signal generation process. In some examples, the QZSS L61 signal generation process can be performed by a satellite vehicle (SV), GNSS satellite (e.g., one or more of the GNSS satellites 230, 330), etc. As illustrated in FIG. 4A, the QZSS L61 signal structure 400a can include two streams. A first stream (e.g., indicated by the upper branch in FIG. 4A), can be a navigation message. The first steam can include a 4 millisecond (ms) pseudo random noise (PRN) short code that is Chip Shift Keying (CSK) modulated by a Reed Solomon (R-S) encoded navigation message. For example, a navigation message is provided to an 8 bits/symbol R-S encoder 410. The R-S encoder 410 generates corresponding 8-bit encoded navigational message symbols (e.g., CSK symbols). A CSK modulator 420 receives the 8-bit encoded navigational message symbols generated by the R-S encoder 410 and a 4 ms PRN code (e.g., Code 1) generated by a code generator 430. The CSK modulator 420 shifts the phase of the PRN code by a number of code chips as indicated by the 8-bit encoded navigational message symbol. A second stream of the QZSS L61 signal structure 400a is indicated by the lower branch in FIG. 4A and includes a 410 ms PRN long code (e.g., Code 2) modulated by a squarewave with a period of 820 ms beginning from 0 (e.g., "010101 . . . ").

Figure 4B:
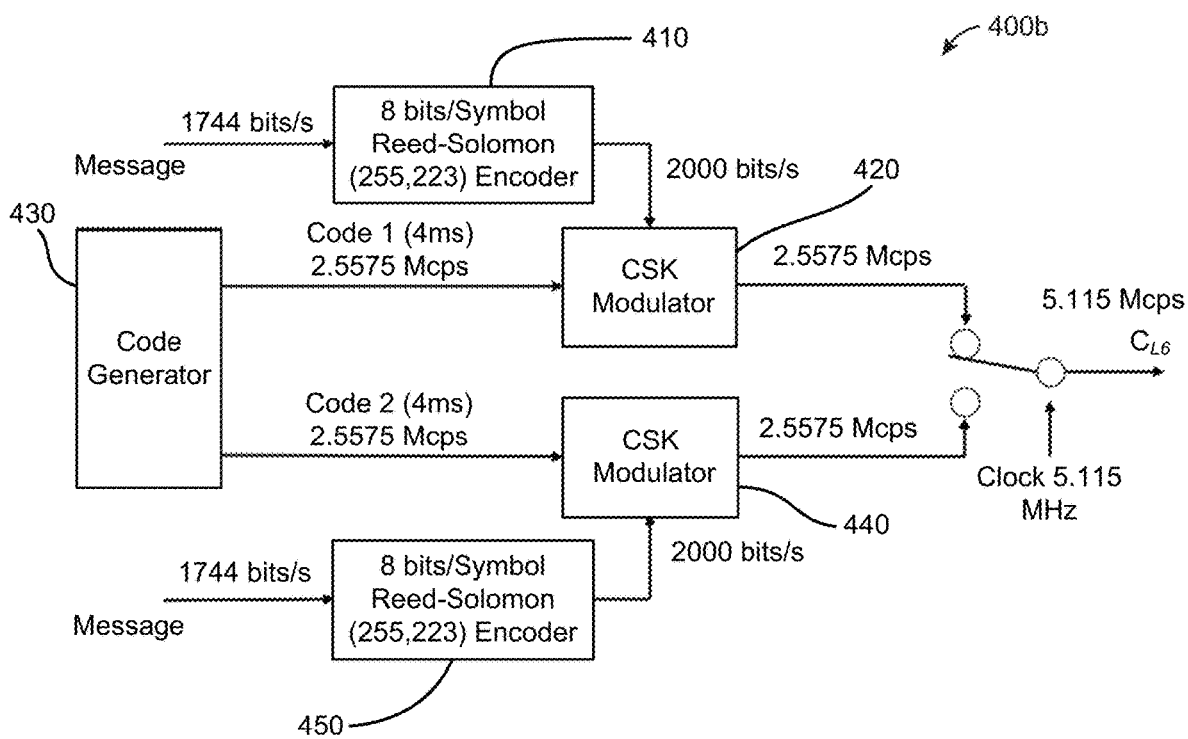
FIG. 4B illustrates an example L62 signal structure associated with QZSS, in accordance with some examples.

FIG. 4B is a diagram illustrating an example QZSS L62 signal structure 400b and associated signal generation process. In some examples, the QZSS L62 signal generation process can be performed by a satellite vehicle (SV), GNSS satellite (e.g., one or more of the GNSS satellites 230, 330), etc. As illustrated in FIG. 4B, the QZSS L62 signal contains two streams, L6D and L6E. Steams L6D and L6E can each contain a respective navigation message. Steams L6D and L6E are both CSK-modulated. The modulation of each of the two input streams to the QZSS L62 signal generation process (e.g., the 'Message' steams L6D and L6E) is similar to the modulation of the first stream of the L61 signal, as described above. For example, the two 'Message' inputs can be provided to respective 8-bits/symbol R-S encoders 410 and 450, which generate corresponding 8-bit encoded navigational message symbols (e.g., CSK symbols) for each of the two 'Message' inputs. A respective first and second CSK modulator 420 and 440 receives the respective 8-bit encoded navigational message symbols generated by the R-S. encoders 410, 450 and a respective 4 ms PRN code (e.g., Code 1 and Code 2) generated by code generator 430. Each CSK modulator 420, 440 shifts the phase of the received PRN code by a number of code chips as indicated by the corresponding 8-bit encoded navigational message symbol.

Figure 5A:
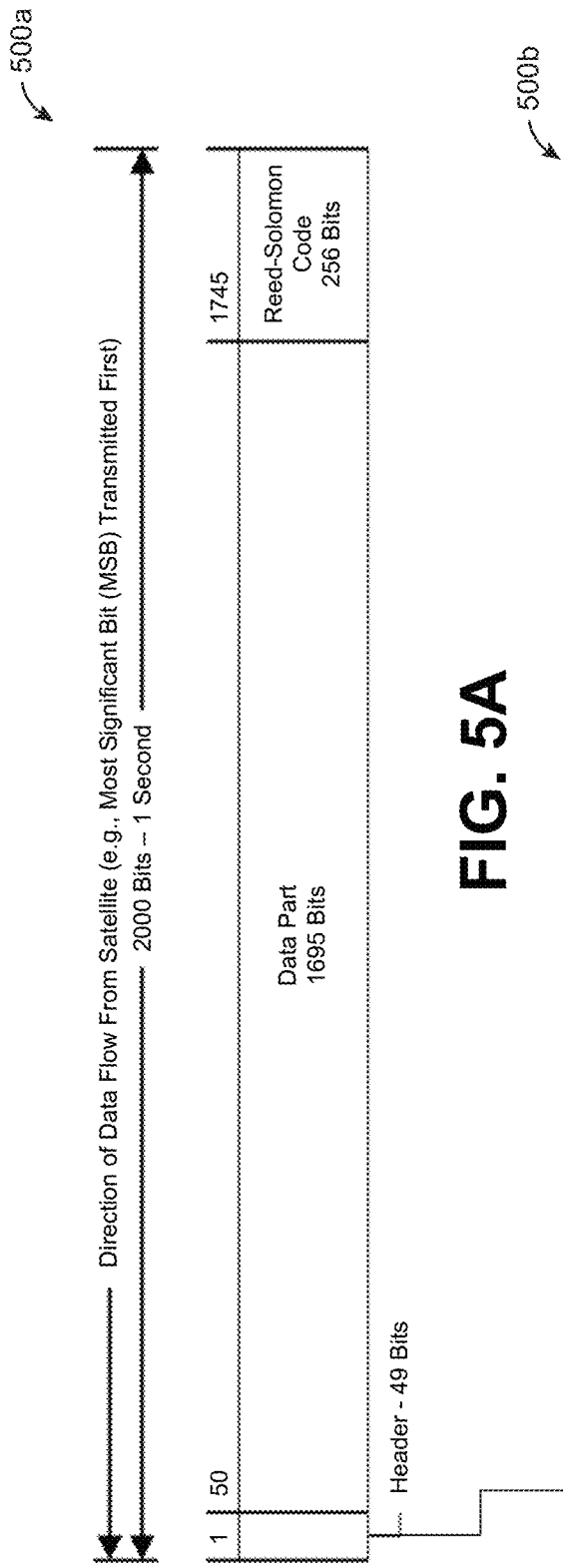
FIG. 5A illustrates an example L6 message structure associated with QZSS, in accordance with some examples.

In some aspects, a QZSS L6 message signal (e.g., the QZSS L61 signal structure 400a and the QZSS L62 signal structure 400b) has a length of 2,000 bits and includes a 49-bit header, a 1,695 bit data section, and a 256-bit Reed-Solomon code. For example, FIG. 5A illustrates an example of the QZSS L6 message structure 500a. In some aspects, a GNSS satellite or other SV can transmit one 2,000 bit L6 message per second (e.g., 2,000 bits per second). The QZSS L6 message signal can include, in order, the 49-bit header, the 1,695-bit data section, and the 256-bit R-S code.

Figure 5B:
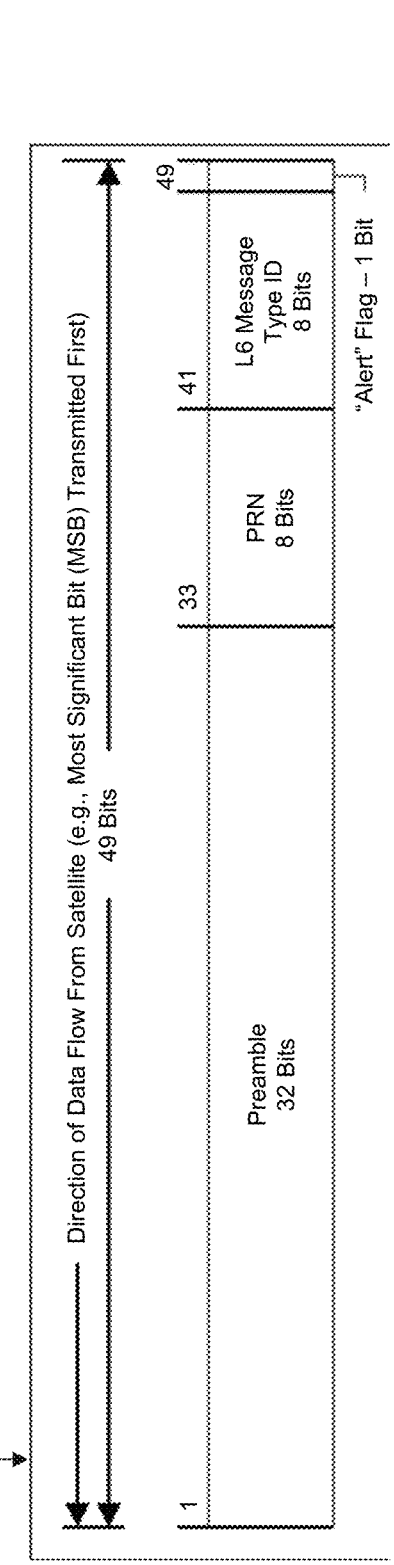
FIG. 5B illustrates an example L6 message header structure associated with QZSS, in accordance with some examples.

FIG. 5B is a diagram illustrating an example of the 49-bit header 500b included in the QZSS L6 message structure. The QZSS L6 message header can include, in order, a 32-bit preamble, an 8-bit PRN code, and 8-bit L6 message type ID, and a 1-bit 'Alert' flag. In some examples, the 32-bit preamble can be a pre-determined preamble and/or pre-determined pattern of the 32 bits. In some aspects, the 8-bit PRN code can be the same as or similar to one or more of the PRN codes described above with respect to FIGS. 4A and 4B (e.g., Code 1, Code 2, generated by code generator 430). In some cases, the L6 message type ID can identify various ones of the L6 message types listed in Table 1, above.

As mentioned previously, the QZSS L61 and L62 signals can be used to provide the QZSS implementation of centimeter-level augmentation (CLAS). The L61 signal structure includes a data signal and a pilot signal, wherein the L61 data signal can be used to obtain QZSS positioning information and the L61 pilot signal can be used to perform signal acquisition of the L61 signal.

QZSS specifies an L62 signal structure that includes only a data signal, and lacks a pilot signal (e.g., which could be used to perform acquisition of the L62 signal, if present). The L62 data signal is Code Shift Keying (CSK) modulated (e.g., modulated on a reference pseudorandom noise (PRN) code). In some cases, the L62 signal is the only signal in the QZSS system that utilizes CSK modulated data without also including an associated pilot signal. A pilot signal (e.g., also referred to as a "pilot code" or "pilot information") is used to improve the accuracy and reliability of signal acquisition. In some cases, by including a pilot signal for only the QZSS L61 signal (e.g., and not including a pilot signal for the L62 QZSS signal), the QZSS system may be seen to provide an efficiency increase at the expense of signal acquisition difficulty. For example, it can be challenging to acquire a CSK modulated signal (e.g., such as the L62 QZSS signal) without an associated pilot signal that may be used to provide synchronization. There is a need for systems and techniques that can be used to acquire the QZSS L62 signal and decode the CSK modulated data, without using a pilot signal (e.g., which the QZSS L62 signal lacks).

Systems, apparatuses, processes (also referred to as methods), and computer-readable media (collectively referred to as "systems and techniques") are described herein for Quasi-Zenith Satellite System (QZSS) signal acquisition. For example, the systems and techniques can be used to acquire a QZSS L62 signal. In one illustrative example, the QZSS L62 signal can be acquired based on a GPS L1 signal that is detected for the same target space vehicle identifier (SVID) as the QZSS L62 signal, as will be described with respect to FIG. 6. In another illustrative example, the QZSS L62 signal can be directly acquired on the L6 band, as will be described with respect to FIG. 7.

Figure 6:
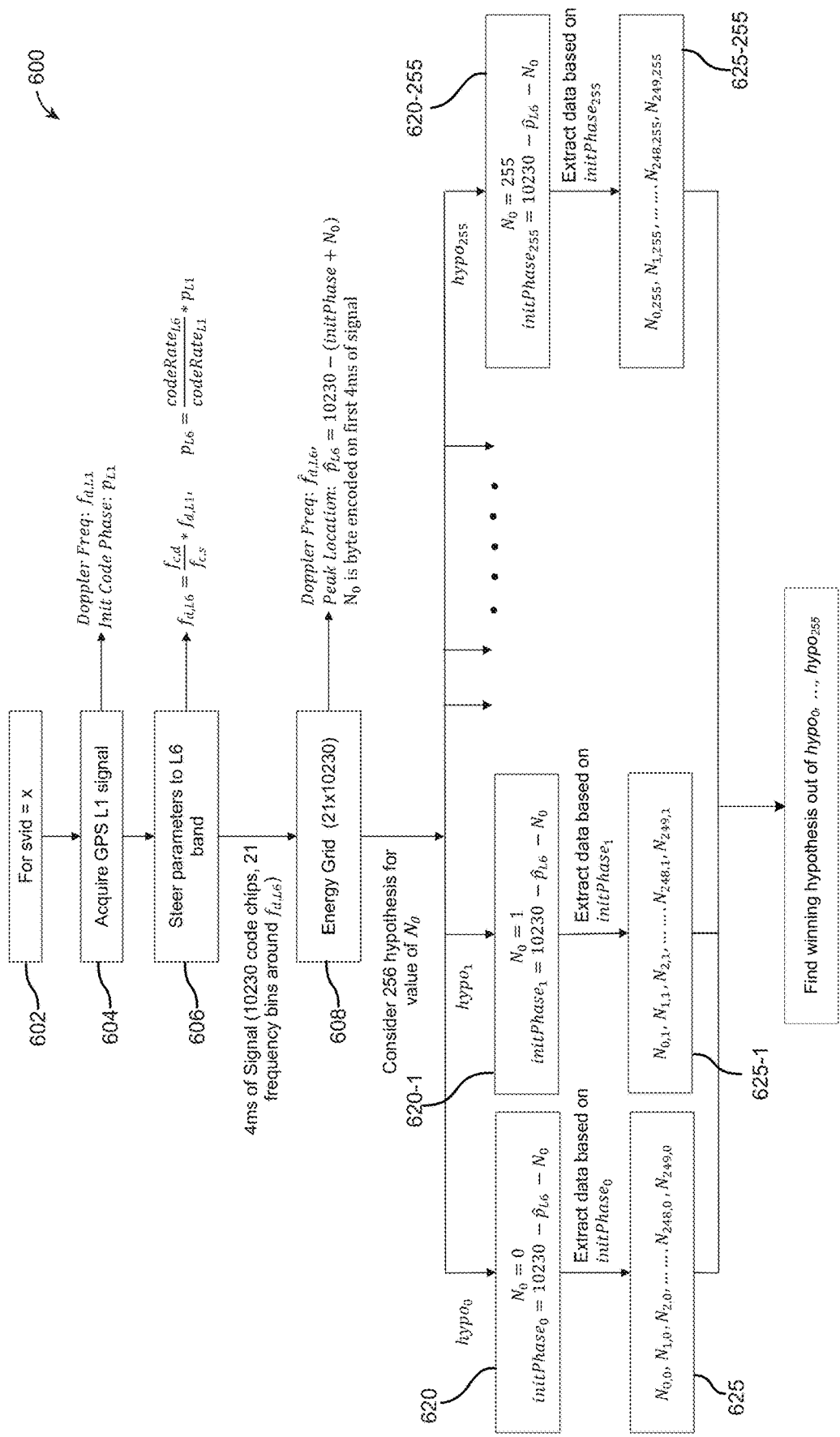
FIG. 6 is a diagram illustrating an example QZSS signal acquisition process based on an L1 signal, in accordance with some examples.

FIG. 6 is a diagram 600 illustrating an example QZSS signal acquisition process based on an L1 signal, in accordance with some examples. In some aspects, the QZSS signal acquisition can be performed for a QZSS L62 signal and the L1 signal can be a GPS L1 signal. In some cases, the GPS L1 signal can be transmitted by or otherwise associated with a satellite that has the same satellite vehicle identifier (SVID) as a satellite that is used to transmit the QZSS L62 signal being acquired. For example, at block 602, an SVID associated with the QZSS L62 signal that is to be acquired can be determined. Based on the QZSS L62 SVID, one or more GPS L1 signals transmitted by a satellite sharing the same SVID can be identified.

At block 604, a GPS L1 signal can be acquired for the target SVID. In some aspects, acquiring the GPS L1 signal can include detecting the GPS L1 signal for the target SVID. An estimated set of signal acquisition parameters associated with the GPS L1 signal can be determined or otherwise measured (e.g., based on acquiring the GPS L1 signal). For example, the set of signal acquisition parameters can include a Doppler frequency $f_{d,L1}$ associated with acquiring the GPS L1 signal. In some aspects, the set of signal acquisition parameters can additionally include an initial code phase $p_{L1}$ associated with acquiring the GPS L1 signal.

At block 606, the GPS L1 signal acquisition parameters (e.g., Doppler frequency $f_{d,L1}$ and initial code phase $p_{L1}$) can be steered to the L6 band. In some aspects, steering the GPS L1 signal acquisition parameters to the L6 band can include determining or estimating one or more (or all) of the same signal acquisition parameters for the L6 band. For example, the L6 Doppler frequency can be determined based on the obtained GPS L1 Doppler frequency as:

$$f_{d,L6} = \frac{f_{c,d}}{f_{c,s}} * f_{d,L1} \quad (1)$$

Here, $f_{d,L6}$ is an estimate of the L6 band Doppler frequency; $f_{d,L1}$ is the Doppler frequency determined (e.g., at block 604) in the set of GPS L1 signal acquisition parameters; $f_{c,d}$ is the center frequency of the steering destination (e.g., the L6 band center frequency); and $f_{c,s}$ is the steering source center frequency (e.g., the GPS L1 band center frequency). In some aspects, the L6 band center frequency and the GPS L1 band center frequency can be pre-determined.

In some examples, the QZSS L6 initial code phase can also be determined based on steering the obtained GPS L1 initial code phase to the L6 band, as:

$$p_{L6} = \frac{codeRate_{L6}}{codeRate_{L1}} * p_{L1} \quad (2)$$

Here, $p_{L6}$ is the estimated L6 band initial code phase; $p_{L1}$ is the initial code phase determined (e.g., at block 604) in the set of GPS L1 signal acquisition parameters; $codeRate_{L6}$ is the code rate associated with the L6 band; and $codeRate_{L1}$ is the code rate associated with the GPS L1 band. The code rates associated with the L6 band and the GPS L1 band can be pre-determined.

In some aspects, the steering of GPS L1 signal acquisition parameters to the L6 band (e.g., estimating the corresponding L6 signal acquisition parameters based on the measured GPS L1 signal acquisition parameters) can be used as a time saving measure to acquire the QZSS L62 signal without actually performing signal acquisition on the L6 band, as will be described in greater depth below.

As mentioned previously, the QZSS L62 signal can include a first data signal and a second data signal. For example, as illustrated in the QZSS L62 signal structure 400b of FIG. 4B, the QZSS L62 signal can include a first 'Message' signal provided as input to a first R-S encoder 410 and a second 'Message' signal provided as input to a second R-S encoder 450. The first and second data signals can each be CSK modulated on or with a respective 4 ms long reference PRN code (e.g., Code 1 and Code 2 depicted in FIG. 4B as being generated by code generator 430). In some aspects, the systems and techniques described herein can perform QZSS L62 signal acquisition based on obtaining the 4 ms code boundary for the QZSS L62 signal being acquired (e.g., corresponding to the 4 ms length of the two reference PRN codes included in the QZSS L62 signal).

In one illustrative example, at block 608, an energy grid can be generated from a 4 ms sample of signal, wherein the energy grid is generated based at least in part on the steered L6 band signal acquisition parameters described above with respect to block 606. In some aspects, the 4 ms sample of signal can be an initial portion of a modulated signal obtained on the L6 band. For example, the 4 ms sample of signal can be an initial portion of a CSK modulated L6 message signal that has not yet been acquired (e.g., not yet been decoded).

In some examples, the energy grid can be generated from the 4 ms sample of signal to include 10,230 code chips and 21 frequency bins around $f_{d,L6}$ (e.g., the estimated L6 Doppler frequency determined at block 606 by steering the GPS L1 signal acquisition Doppler frequency to the L6 band).

In some aspects, the energy grid of 4 ms correlation codes (and the associated Doppler bins around the estimated L6 band Doppler frequency, $f_{d,L6}$) can be used to determine a refined, or more precise, Doppler estimation for the L6 band. For example, a refined L6 Doppler frequency $\hat{f}_{d,L6}$ can be determined based on a maximum peak energy associated with the energy grid. In one illustrative example, the refined L6 Doppler frequency $\hat{f}_{d,L6}$ can be determined based on a peak location within the energy grid. In some aspects, for each 4 ms correlation (e.g., coherent, at a fixed Doppler), two maximum energy peaks may be obtained. The presence of two maximum energy peaks can be associated with the use of CSK modulation in the QZSS L62 signal. For example, two energy peaks may be obtained based on a given 4 ms correlation including two CSK modulation bytes (e.g., based on an unknown code boundary between the two CSK modulation bytes). A first energy peak determined or obtained based on a given 4 ms correlation may be associated with a first CSK modulated byte included in a first portion of the 4 ms correlation code, and a second energy peak may be associated with at least a portion of a second CSK modulated byte included in a second portion of the same 4 ms correlation code. In some aspects, the two energy peaks can be obtained based on the first CSK modulated byte/first portion of the 4 ms correlation code and the second CSK modulated byte/second portion of the 4 ms correlation code being associated with a same PRN code (e.g., the PRN code associated the 4 ms correlation code). In some examples, the magnitude of each energy peak (e.g., of the two energy peaks that may be determined or obtained based on a given 4 ms correlation code) can be based on a quantity or percentage of the first and second CSK modulated bytes that is included in the given 4 ms correlation code.

In one illustrative example, the location of a maximum energy peak within the energy grid can be associated with an initial phase and an initial data byte. For example, each maximum energy peak location (e.g., a particular code chip out of the 10,230 code chips included in the energy grid) can indicate a sum of the initial code phase associated with the modulated QZSS L62 signal and the initial data byte included in the data portion of the QZSS L62 signal:

$$\hat{p}_{L6} = 10{,}230 - (\text{initPhase} + N_0) \qquad (3)$$

Here, $\hat{p}_{L6}$ represents a peak location (e.g., global peak) of the energy grid correlation generated for the first 4 ms of signal; 10,230 is an energy grid parameter (e.g., number of code chips included in or generated for the first 4 ms of signal); initPhase is the initial code phase of the first 4 ms of signal/associated with the modulated QZSS L62 signal; and $N_0$ is the data byte encoded on the first 4 ms of signal.

In the context of the QZSS L62 signal, the maximum energy peak locations within the energy grid cannot be used to directly obtain the 4 ms code boundary associated with the QZSS L62 signal, because the first CSK modulated data byte included in the QZSS L62 signal is unknown (e.g., the data byte $N_0$ encoded on the first 4 ms of signal is unknown).

In one illustrative example, the systems and techniques described herein can determine or otherwise obtain the 4 ms code boundary associated with the QZSS L62 signal by generating 256 hypotheses for each possible value of the data byte $N_0$. The data byte $N_0$ can be a CSK modulated 8-bit symbol with 256 possible data byte values (e.g., each 4 ms portion of the L62 message, such as having the L6 message structure 500a (e.g., (e.g., L62 message) depicted in FIG. 5A, CSK modulates a single data byte having a value from 0 to 255).

As illustrated in FIG. 6, a plurality of hypotheses, $\text{hypo}_0$, $\text{hypo}_1$, ..., $\text{hypo}_{255}$ (indicated at 620, 620-1, ..., 620-255) can be generated, with each hypothesis generated using a different one of the possible data byte values $N_o=0$, $N_0=1$, ..., $N_0=255$. For example, one hypothesis can be generated for each of the 256 possible data byte values for $N_0$.

Based on the possible data byte value $N_0$ being fixed for each hypothesis, an initPhase value (e.g., the initial code phase of the first 4 ms of signal) can be determined from the peak location of the energy grid correlation. For example, Eq. (3) can be used to generate the 256 hypotheses as:

$$\text{initPhase}_0 = 10{,}230 - \hat{p}_{L6} - N_0 \text{ (with } N_0 = 0\text{)} \qquad (4)$$
$$\text{initPhase}_1 = 10{,}230 - \hat{p}_{L6} - N_0 \text{ (with } N_0 = 1\text{)}$$
$$\ldots$$
$$\text{initPhase}_{255} = 10{,}230 - \hat{p}_{L6} - N_0 \text{(with } N_0 = 255\text{)}$$

For each of the 256 initPhase values (e.g., determined for each of the 256 $N_0$ hypotheses), the 4 ms code boundary associated with the QZSS L62 signal can be fixed. For example, the code boundary has a potential error range of ±255 code bins, which is covered by the 256 hypotheses generated as described above. After the 4 ms code boundary associated with each hypothesis is fixed, data can be extracted from a correlation peak (e.g., peak energy location) associated with or determined for a subsequent 4 ms code (e.g., a subsequent 4 ms portion of the modulated QZSS L6 message signal, following the initial 4 ms portion from which the plurality of hypotheses were generated).

In one illustrative example, 250 bytes can be acquired for each of the hypotheses 620, 620-1, ..., 620-255 (e.g., 250 4 ms correlations may be utilized, as each 4 ms of code CSK modulates one data byte). For example, for the first hypothesis 620 (e.g., $\text{hypo}_0$, with $N_0=0$ and $\text{initPhase}_0=10{,}230-\hat{p}_{L6}-N_0$), a first series of extracted data 625 can be determined based on using $\text{initPhase}_0$ to acquire and decode the subsequent 250 4 ms correlation codes as: $N_{0,0}$, $N_{1,0}$, $N_{2,0}$, ..., $N_{248,0}$, $N_{249,0}$.

For the second hypothesis 620-1 (e.g., $\text{hypo}_1$, with $N_0=1$ and $\text{initPhase}_1=10{,}230-\hat{p}_{L6}-N_1$), a second series of extracted data 625-1 can be determined based on using $\text{initPhase}_1$ to acquire and decode the subsequent 250 4 ms correlation codes as: $N_{0,1}$, $N_{1,1}$, $N_{2,1}$, ..., $N_{d48,1}$, $N_{249,1}$.

The same process can be performed to extract 250-byte data series for the remaining hypotheses, with the final hypothesis 620-255 (e.g., $\text{hypo}_{255}$, with $N_0=255$ and $\text{initPhase}_{255}=10{,}230-\hat{p}_{L6}-N_{255}$) being associated with a final 250-byte data series 625-255 extracted based on using $\text{initPhase}_{255}$ to decode the subsequent 250 4 ms correlation codes as: $N_{0,255}$, $N_{1,255}$, $N_{2,255}$, ..., $N_{248,255}$, $N_{249,255}$.

At block 612, each hypothesis and its associated series of extracted data (e.g., the 256 different series of extracted data 625, 625-1, ..., 625-255) can be analyzed to locate the particular one of the 256 different hypotheses that results in an extracted 250-byte data series which includes a fixed 32-bit header preamble associated with the QZSS L62 signal. For example, the 256 series of extracted data can be analyzed to determine a winning hypothesis that is associated with a series of extracted data which includes the QZSS L6 header preamble (e.g., L62 header preamble) depicted in FIGS. 5A and 5B. In one illustrative example, the 32-bit QZSS L62 header preamble can be pre-determined (e.g., '00011010110011111111111110000011101' in bits or '26 207

252 29' in bytes). In some aspects, the 32-bit preamble can be followed by an 8-bit PRN ID, as also depicted in FIG. 5B.

Based on determining the winning hypothesis (e.g., the particular hypothesis hypo$_k$ that results in a series of extracted data that includes the fixed 32-bit header preamble associated with the QZSS L62 signal), the correct initial phase value initPhase$_k$ can be determined for acquiring the QZSS L62 signal and decoding its corresponding CSK modulated data bytes, without using a pilot signal. For example, the determined correct initial phase value initPhase$_k$ can be used to decode the subsequent 4 ms portions of the signal (e.g., in some cases, each L6 message may include a total of 2,000 bits transmitted over one second, of which 1,695 bits are data bits). In some aspects, with the known correct initial phase value initPhase$_k$ and the known peak location $\hat{p}_{L6}$, the CSK modulated data bytes of the QZSS L62 signal can be decoded as:

$$N_i = 10{,}230 - \text{initPhase}_k - \hat{p}_{L6} \tag{5}$$

for all remaining CSK modulated data bytes $N_i$ that are included in the 1,695-bit data portion of a given QZSS L62 message.

In another illustrative example, a QZSS L62 signal can be directly acquired on the L6 band, without using signal acquisition parameters determined for another frequency band (e.g., such as the GPS L1 band, as was described above with respect to FIG. 6). For example, FIG. 7 is a diagram 700 illustrating an example QZSS signal acquisition process based an L6 signal.

Figure 7:
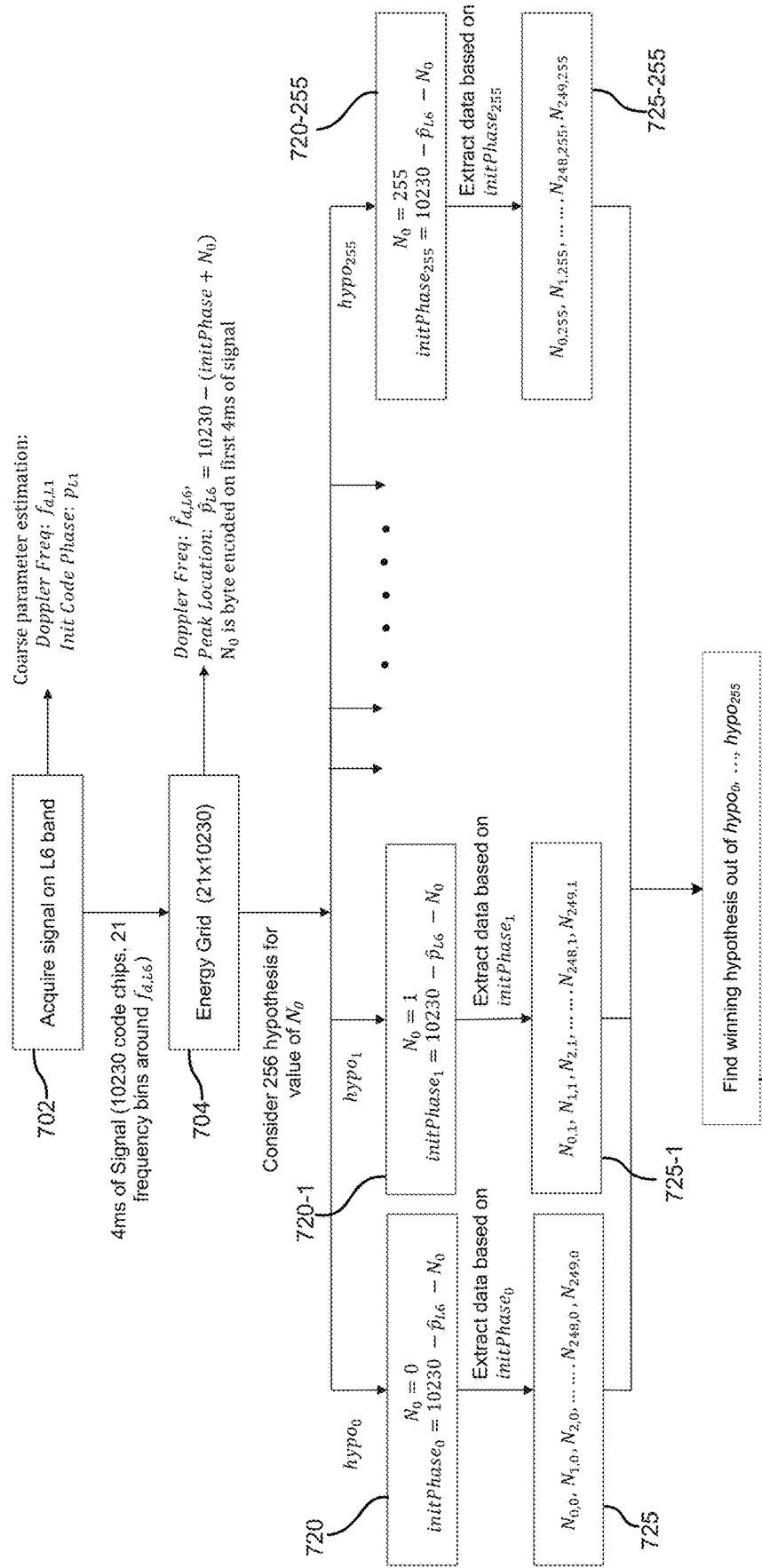
FIG. 7 is a diagram illustrating an example QZSS signal acquisition process based an L6 signal, in accordance with some examples.

As depicted in FIG. 7, a QZSS L62 signal can be acquired based on acquisition parameters obtained or otherwise determined for a directly acquired L62 signal. For example, the QZSS L62 signal can be directly acquired on the L6 band using either one of (or both of) the two data signals included in the QZSS L62 signal (e.g., in the context of FIG. 4B, the first data signal associated with the first 'Message' modulated with Code 1 using CSK modulator 420 and the second data signal associated with the second 'Message' modulated with Code 2 using CSK modulator 440).

At block 702, a modulated L6 message signal can be obtained on the L6 frequency band. The modulated L6 message signal can be a QZSS L61 or L62 signal that has not yet been acquired (e.g., not yet demodulated or decoded). In some aspects, an estimated set of signal acquisition parameters can be determined for the modulated L6 message signal. For example, a coarse acquisition parameter estimation can be determined for one or more portions of the QZSS L62 signal that is directly acquired on the L6 band. The coarse parameter acquisition can include an estimated Doppler frequency $f_{d,L6}$ for the modulated L6 signal and an estimated initial code phase $p_{L6}$ for the modulated L6 signal.

At block 704, the coarse signal acquisition parameters that are directly acquired on the L6 band (e.g., the estimated Doppler frequency $f_{d,L6}$ and initial code phase $p_{L6}$ for the modulated L6 signal) can be used to generate an energy grid of 4 ms correlation codes. In some examples, the energy grid can be generated in a same or similar manner as described above with respect to the energy grid generated at block 608 of FIG. 6.

Based on the location of maximum peak energy within the energy grid, the coarse signal acquisition parameters determined at block 702 can be refined. For example, a refined L6 Doppler frequency estimation $\hat{f}_{d,L6}$ can be determined for subsequently acquiring and decoding the QZSS L62 signal (e.g., as described above with respect to FIG. 6). In some aspects, after generating the energy grid and determining the refined L6 Doppler frequency estimation $\hat{f}_{d,L6}$ at block 702, the example QZSS L62 signal acquisition process of FIG. 7 can proceed in a same or similar manner as described above with respect to FIG. 6.

For example, the example QZSS L62 signal acquisition process of FIG. 7 can generate a plurality of hypotheses 720, 720-1, 000, 720-255 (e.g., hypo$_1$, . . . , hypo$_{255}$) for the 256 possible values of the initial data byte $N_0$ in a same or similar manner as described above with respect to FIG. 6

A plurality of 250-byte data series 725, 725-1, 000, 725-255 can subsequently be extracted from the modulated QZSS L62 message signal based on a corresponding initial phase determined for each hypothesis (e.g., initPhase$_0$, . . . , initPhase$_{255}$), in a same or similar manner as described above with respect to FIG. 6.

At block 708, the examples QZSS L62 signal acquisition process of FIG. 7 can analyze the 256 different series of extracted data bytes 725, 725-1, 000, 725-255 and locate the hypothesis hypo$_k$ that is associated with an extracted 250-byte data series that includes the fixed 32-bit header preamble associated with the QZSS L62 signal, in a manner that is the same or similar as that described above with respect to block 612 of FIG. 6.

Figure 8:
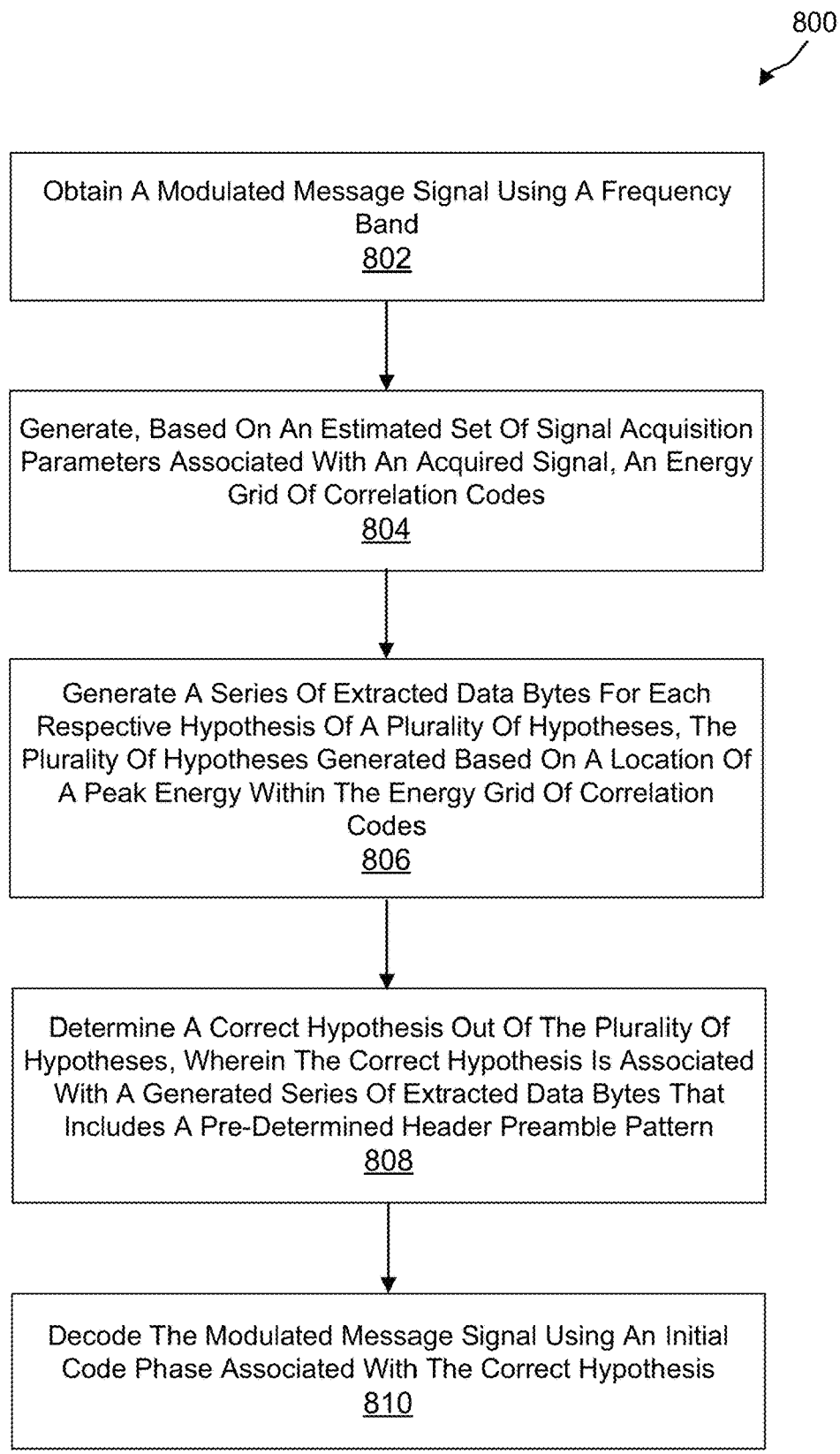
FIG. 8 is a flow diagram illustrating an example of a process for QZSS signal acquisition, in accordance with some examples.

FIG. 8 is a flowchart illustrating an example of a process 800 for Quasi-Zenith Satellite System (QZSS) signal acquisition. At block 802, the process 800 includes obtaining a modulated message signal using a frequency band. For example, the modulated message signal can be a modulated L6 message signal and the frequency band can be an L6 frequency band. In some examples, the modulated message signal can be obtained by a UE, such as UE 105 illustrated in FIG. 1. In some cases, the modulated message signal can be obtained by a GNSS receiver, such as GNSS receiver 210 illustrated in FIG. 2, and/or GNSS receiver 310 illustrated in FIG. 3. In some cases, the modulated message signal can be obtained from (e.g., transmitted by) one or more GNSS satellites, such as GNSS satellites 110 illustrated in FIG. 1, GNSS satellites 230 illustrated in FIG. 2, and/or GNSS satellites 330 illustrated in FIG. 3.

In some examples, the modulated message signal can be a QZSS L6 message signal. For example, the modulated message signal can include a QZSS L61 message signal, which may be the same as or similar to the QZSS L61 message signal structure 400$a$ illustrated in FIG. 4A. In some examples, the modulated message signal can include a QZSS L62 message signal, which may be the same as or similar to the QZSS L62 message signal structure 400$b$ illustrated in FIG. 4B. In some cases, the modulated message signal can be a QZSS L6 message signal that includes some, or all, of the example L6 message structure 500$a$ illustrated in FIG. 5A and/or includes some, or all, of the example L6 header 500$b$ structure illustrated in FIG. 5B. In some examples, the modulated message signal can be a QZSS L6 message signal acquired based on some, or all, of the example QZSS signal acquisition process based on an L1 signal illustrated in FIG. 6 and/or can be a QZSS L6 message signal acquired based on some, or all, of the example QZSS signal acquisition process based on an L6 signal illustrated in FIG. 7.

At block 804, the process 800 includes generating, based on an estimated set of signal acquisition parameters associated with an acquired signal, an energy grid of correlation codes. For example, the estimated set of signal acquisition parameters can include an estimated Doppler frequency and an estimated initial code phase associated with the acquired signal. In some cases, the acquired signal can be a GPS L1 signal acquired using an L1 frequency band. In some cases, the energy grid of correlation codes can be the same as or similar to the energy grid of correlation codes described with respect to block 608 illustrated in FIG. 6 and/or the energy grid of correlation codes described with respect to block 704 illustrated in FIG. 7.

Generating the energy grid of correlation codes can be further based on an initial portion of the modulated message signal. In some examples, generating the energy grid of correlation codes can include dividing the initial portion of the modulated message signal into a plurality of frequency bins around an estimated Doppler frequency. In some examples, the location of the peak energy within the energy grid can be a location of a correlation code generated based on the initial portion of the modulated message signal.

In some examples, determining the estimated set of signal acquisition parameters comprises determining an estimated Doppler frequency associated with the modulated L6 message signal, based on steering a Doppler frequency associated with the acquired signal (e.g., a GPS L1 signal) from the L1 frequency band to the L6 frequency band. In some cases, determining the estimated set of signal acquisition parameters further comprises determining an estimated initial code phase associated with the modulated L6 message signal, based on steering a code phase associated with the GPS L1 signal from the L1 frequency band to the L6 frequency band.

In some cases, the modulated message signal is a modulated L6 message signal obtained on an L6 frequency band, and the modulated message signal and the acquired signal are the same. In such cases, determining the estimated set of signal acquisition parameters can comprise determining a coarse estimation of a Doppler frequency associated with the modulated L6 message signal and determining a coarse estimation of an initial code phase associated with the modulated L6 message signal.

At block 806, the process 800 includes generating a series of extracted data bytes for each respective hypothesis of a plurality of hypotheses, the plurality of hypotheses generated based on a location of a peak energy within the energy grid of correlation codes. For example, the series of extracted data bytes can be the same as or similar to the series of extracted data bytes 620, 620-1, . . . , 620-255 illustrated in FIG. 6 and/or can be the same as or similar to the series of extracted data bytes 72-, 720-1, . . . , 720-255 illustrated in FIG. 7. In some examples, the plurality of hypotheses can be the same as or similar to the hypotheses $\text{hypo}_0, \ldots, \text{hypo}_{255}$ illustrated in FIGS. 6 and 7.

In some examples, each respective hypothesis of the plurality of hypotheses may be associated with a different data byte value that may be encoded in an initial portion of the modulated message signal. For example, the different data byte value can include some, or all, of the different data byte values $N_0, \ldots, N_{255}$ illustrated in FIGS. 6 and 7. In some cases, an initial code phase can be determined for each respective hypothesis based on the peak energy within the energy grid and a respective data byte value associated with each respective hypothesis. For example, the initial code phase can be determined as described with respect to the $\text{initPhase}_0, \ldots, \text{initPhase}_{255}$ initial code phases illustrated in FIGS. 6 and 7. In some cases, generating the series of extracted data bytes for each respective hypothesis comprises decoding an initial portion of the modulated message signal using the initial code phase determined for each respective hypothesis. In some cases, each respective hypothesis can be associated with a different position of a code boundary between an initial portion of the modulated message signal and a remaining portion of the modulated message signal.

At block 808, the process 800 includes determining a correct hypothesis out of the plurality of hypotheses, wherein the correct hypothesis is associated with a generated series of extracted data bytes that includes a pre-determined header preamble pattern. For example, the modulated message signal can be a QZSS L6 message signal and the pre-determined header preamble pattern can be a QZSS L6 message header. In some cases, the QZSS L6 message header can be the same as or similar to the example L6 message header structure 500*b* illustrated in FIG. 5B.

At block 810, the process 800 includes decoding the modulated message signal using an initial code phase associated with the correct hypothesis. For example, the initial code phase associated with the correct hypothesis can be the initial code phase associated with the hypothesis that includes the pre-determined header preamble pattern (e.g., the hypothesis that includes the QZSS L6 message header). In some cases, the modulated message signal is decoded based on one or more of the initial code phase associated with the correct hypothesis and an initial data byte value associated with the correct hypothesis.

In some examples, the processes described herein (e.g., process 800 and/or any other process described herein) may be performed by a computing device, apparatus, or system. In one example, the process 800 can be performed by a computing device or system having the computing device architecture 1100 of FIG. 11. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 800 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
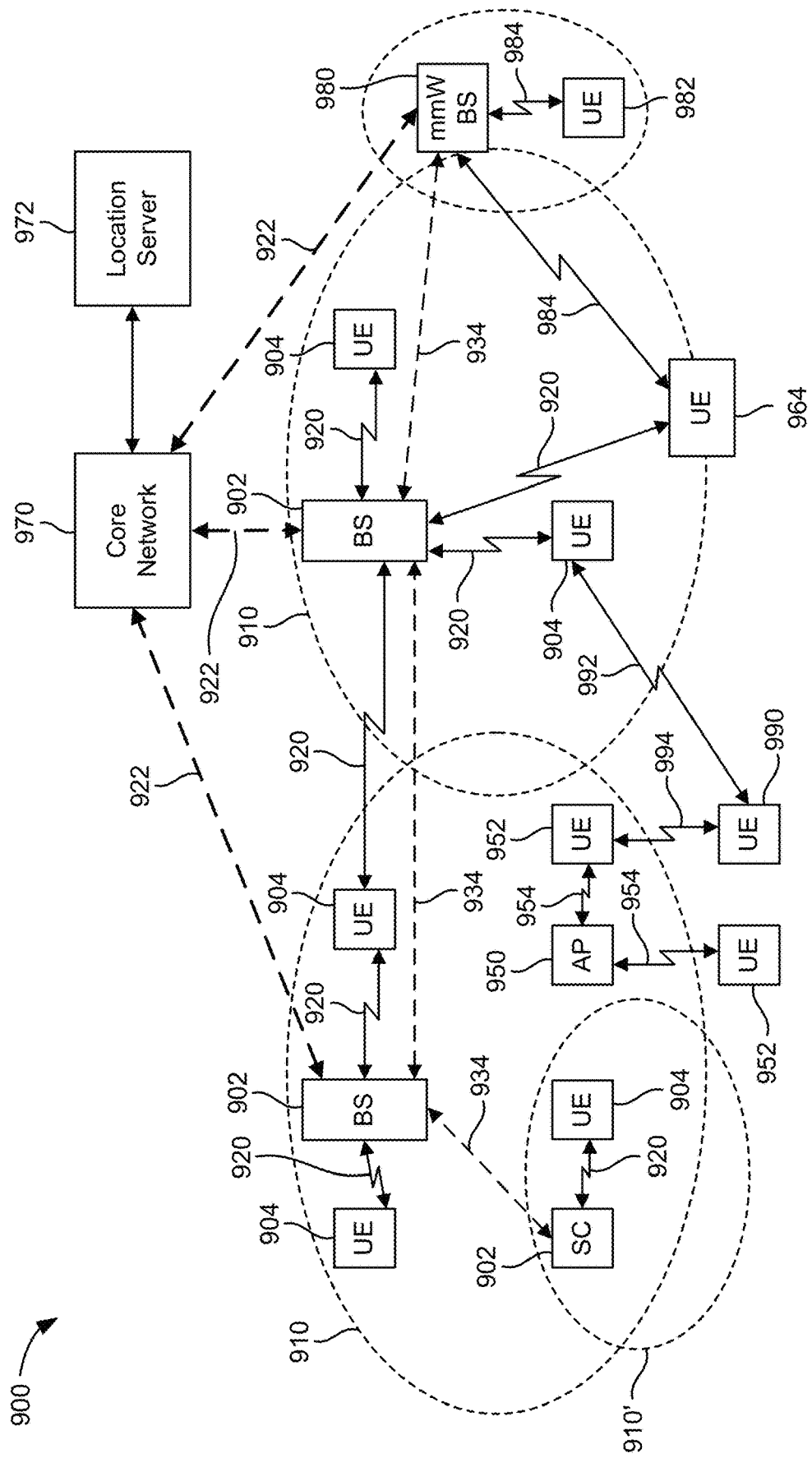
FIG. 9 is a diagram illustrating an example wireless communications system, in accordance with some aspects of the present disclosure.

According to various aspects, FIG. 9 illustrates an exemplary wireless communications system 900. The wireless communications system 900 (which may also be referred to as a wireless wide area network (WWAN)) can include various base stations 902 and various UEs 904. In some aspects, the base stations 902 may also be referred to as "network entities" or "network nodes." One or more of the base stations 902 can be implemented in an aggregated or monolithic base station architecture. Additionally or alternatively, one or more of the base stations 902 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 902 can include macro cell base stations (high power cellular base stations) and/or small cell base stations (low power cellular base stations). In an aspect, the macro cell base station may include eNBs and/or ng-eNBs where the wireless communications system 900 corresponds to a long term evolution (LTE) network, or gNBs where the wireless communications system 900 corresponds to a NR network, or a combination of both, and the small cell base stations may include femtocells, picocells, microcells, etc.

The base stations 902 may collectively form a RAN and interface with a core network 970 (e.g., an evolved packet core (EPC) or a 5G core (5GC)) through backhaul links 922, and through the core network 970 to one or more location servers 972 (which may be part of core network 970 or may be external to core network 970). In addition to other functions, the base stations 902 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 902 may communicate with each other directly or indirectly (e.g., through the EPC or 5GC) over backhaul links 934, which may be wired and/or wireless.

The base stations 902 may wirelessly communicate with the UEs 904. Each of the base stations 902 may provide communication coverage for a respective geographic coverage area 910. In an aspect, one or more cells may be supported by a base station 902 in each coverage area 910. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 910.

While neighboring macro cell base station 902 geographic coverage areas 910 may partially overlap (e.g., in a handover region), some of the geographic coverage areas 910 may be substantially overlapped by a larger geographic coverage area 910. For example, a small cell base station 902' may have a coverage area 910' that substantially overlaps with the coverage area 910 of one or more macro cell base stations 902. A network that includes both small cell and macro cell base stations may be known as a heterogeneous network. A heterogeneous network may also include home eNBs (HeNBs), which may provide service to a restricted group known as a closed subscriber group (CSG).

The communication links 920 between the base stations 902 and the UEs 904 may include uplink (also referred to as reverse link) transmissions from a UE 904 to a base station 902 and/or downlink (also referred to as forward link) transmissions from a base station 902 to a UE 904. The communication links 920 may use MIMO antenna technology, including spatial multiplexing, beamforming, and/or transmit diversity. The communication links 920 may be through one or more carrier frequencies. Allocation of carriers may be asymmetric with respect to downlink and uplink (e.g., more or less carriers may be allocated for downlink than for uplink).

The wireless communications system 900 may further include a WLAN AP 950 in communication with WLAN stations (STAs) 952 via communication links 954 in an unlicensed frequency spectrum (e.g., 5 Gigahertz (GHz)). When communicating in an unlicensed frequency spectrum, the WLAN STAs 952 and/or the WLAN AP 950 may perform a clear channel assessment (CCA) or listen before talk (LBT) procedure prior to communicating in order to determine whether the channel is available. In some examples, the wireless communications system 900 can include devices (e.g., UEs, etc.) that communicate with one or more UEs 904, base stations 902, APs 950, etc. utilizing the ultra-wideband (UWB) spectrum. The UWB spectrum can range from 3.1 to 10.5 GHz.

The small cell base station 902' may operate in a licensed and/or an unlicensed frequency spectrum. When operating in an unlicensed frequency spectrum, the small cell base station 902' may employ LTE or NR technology and use the same 5 GHz unlicensed frequency spectrum as used by the WLAN AP 950. The small cell base station 902', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 900 may further include a millimeter wave (mmW) base station 980 that may operate in mmW frequencies and/or near mmW frequencies in communication with a UE 982. The mmW base station 980 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 980 and the UE 982 may utilize beamforming (transmit and/or receive) over an mmW communication link 984 to compensate for the extremely high path loss and short range. Further, it will be appreciated that in alternative configurations, one or more base stations 902 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 902/980, UEs 904/982) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 904/982 and the cell in which the UE 904/982 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 904 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 904/982 in a cell may have different downlink primary carriers. The same is true for the uplink primary carriers. The network is able to change the primary carrier of any UE 904/982 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 9, one of the frequencies utilized by the macro cell base stations 902 may be an anchor carrier (or "PCell") and other frequencies utilized by the macro cell base stations 902 and/or the mmW base station 980 may be secondary carriers ("SCells"). In carrier aggregation, the base stations 902 and/or the UEs 904 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 904/982 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 902 and/or a UE 904 is equipped with multiple receivers and/or transmitters. For example, a UE 904 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 904 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 904 is being served in band 'X' or band 'Y,' because of the separate "Receiver 2," the UE 904 can measure band 'Z' without interrupting the service on band 'X' or band 'Y.'

The wireless communications system 900 may further include a UE 964 that may communicate with a macro cell base station 902 over a communication link 920 and/or the mmW base station 980 over an mmW communication link 984. For example, the macro cell base station 902 may support a PCell and one or more SCells for the UE 964 and the mmW base station 980 may support one or more SCells for the UE 964.

The wireless communications system 900 may further include one or more UEs, such as UE 990, that connects indirectly to one or more communication networks via one or more device-to-device (D2D) peer-to-peer (P2P) links (referred to as "sidelinks"). In the example of FIG. 9, UE 990 has a D2D P2P link 992 with one of the UEs 904 connected to one of the base stations 902 (e.g., through which UE 990 may indirectly obtain cellular connectivity) and a D2D P2P link 994 with WLAN STA 952 connected to the WLAN AP 950 (through which UE 990 may indirectly obtain WLAN-based Internet connectivity). In an example, the D2D P2P links 992 and 994 may be supported with any well-known D2D RAT, such as LTE Direct (LTE-D), Wi-Fi Direct (Wi-Fi-D), Bluetooth®, and so on.

Figure 10:
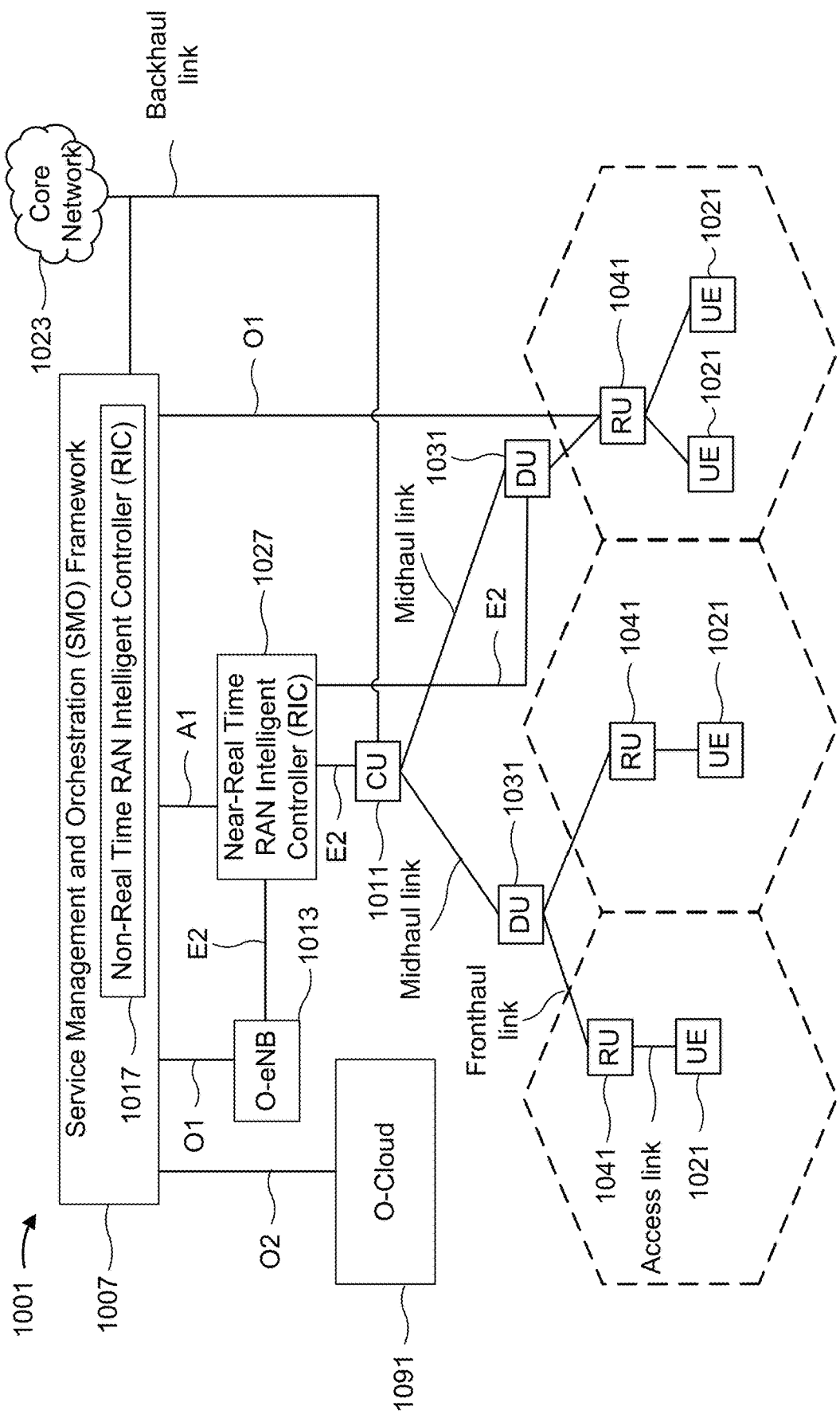
FIG. 10 is a diagram illustrating an example of a disaggregated base station architecture, which may be employed by the disclosed system for providing mini slots for sidelink positioning with wireless communication systems, in accordance with some examples.

FIG. 10 is a diagram illustrating an example of a disaggregated base station architecture, which may be employed by the disclosed system for providing mini slots for sidelink positioning with wireless communication systems, in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 10 shows a diagram illustrating an example disaggregated base station 1001 architecture. The disaggregated base station 1001 architecture may include one or more central units (CUs) 1011 that can communicate directly with a core network 1023 via a backhaul link, or indirectly with the core network 1023 through one or more disaggregated base station units (such as a Near-Real Time (Near-RT) RAN Intelligent Controller (RIC) 1027 via an E2 link, or a Non-Real Time (Non-RT) RIC 1017 associated with a Service Management and Orchestration (SMO) Framework 1007, or both). A CU 1011 may communicate with one or more distributed units (DUs) 1031 via respective midhaul links, such as an F1 interface. The DUs 1031 may communicate with one or more radio units (RUs) 1041 via respective fronthaul links. The RUs 1041 may communicate with respective UEs 1021 via one or more RF access links. In some implementations, the UE 1021 may be simultaneously served by multiple RUs 1041.

Each of the units, e.g., the CUs 1011, the DUs 1031, the RUs 1041, as well as the Near-RT RICs 1027, the Non-RT RICs 1017 and the SMO Framework 1007, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1011 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1011. The CU 1011 may be configured to handle user plane functionality (i.e., Central Unit-User Plane (CU-UP)), control plane functionality (i.e., Central Unit-Control Plane (CU-CP)), or a combination thereof. In some implementations, the CU 1011 can be logically split into one or more CU-UP units and one or more CU-CP units. The CU-UP unit can communicate bidirectionally with the CU-CP unit via an interface, such as the E1 interface when implemented in an O-RAN configuration. The CU 1011 can be implemented to communicate with the DU 1031, as necessary, for network control and signaling.

The DU 1031 may correspond to a logical unit that includes one or more base station functions to control the operation of one or more RUs 1041. In some aspects, the DU 1031 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 1031 may further host one or more low PHY layers. Each layer (or module) can be implemented with an interface configured to communicate signals with other layers (and modules) hosted by the DU 1031, or with the control functions hosted by the CU 1011.

Lower-layer functionality can be implemented by one or more RUs 1041. In some deployments, an RU 1041, controlled by a DU 1031, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1041 can be implemented to handle over the air (OTA) communication with one or more UEs 1021. In some implementations, real-time and non-real-time aspects of control and user plane communication with the RU(s) 1041 can be controlled by the corresponding DU 1031. In some scenarios, this configuration can enable the DU(s) 1031 and the CU 1011 to be implemented in a cloud-based RAN architecture, such as a vRAN architecture.

The SMO Framework 1007 may be configured to support RAN deployment and provisioning of non-virtualized and virtualized network elements. For non-virtualized network elements, the SMO Framework 1007 may be configured to support the deployment of dedicated physical resources for RAN coverage requirements which may be managed via an operations and maintenance interface (such as an O1 interface). For virtualized network elements, the SMO Framework 1007 may be configured to interact with a cloud computing platform (such as an open cloud (O-Cloud) 1091) to perform network element life cycle management (such as to instantiate virtualized network elements) via a cloud computing platform interface (such as an O2 interface). Such virtualized network elements can include, but are not limited to, CUs 1011, DUs 1031, RUs 1041 and Near-RT RICs 1027. In some implementations, the SMO Framework 1007 can communicate with a hardware aspect of a 4G RAN, such as an open eNB (O-eNB) 1013, via an O1 interface. Additionally, in some implementations, the SMO Framework 1007 can communicate directly with one or more RUs 1041 via an O1 interface. The SMO Framework 1007 also may include a Non-RT RIC 1017 configured to support functionality of the SMO Framework 1007.

The Non-RT RIC 1017 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1027. The Non-RT RIC 1017 may be coupled to or communicate with (such as via an A1 interface) the Near-RT RIC 1027. The Near-RT RIC 1027 may be configured to include a logical function that enables near-real-time control and optimization of RAN elements and resources via data collection and actions over an interface (such as via an E2 interface) connecting one or more CUs 1011, one or more DUs 1031, or both, as well as an O-eNB 1013, with the Near-RT RIC 1027.

In some implementations, to generate AI/ML models to be deployed in the Near-RT RIC 1027, the Non-RT RIC 1017 may receive parameters or external enrichment information from external servers. Such information may be utilized by the Near-RT RIC 1027 and may be received at the SMO Framework 1007 or the Non-RT RIC 1017 from non-network data sources or from network functions. In some examples, the Non-RT RIC 1017 or the Near-RT RIC 1027 may be configured to tune RAN behavior or performance. For example, the Non-RT RIC 1017 may monitor long-term trends and patterns for performance and employ AI/ML models to perform corrective actions through the SMO Framework 1007 (such as reconfiguration via O1) or via creation of RAN management policies (such as A1 policies).

Figure 11:
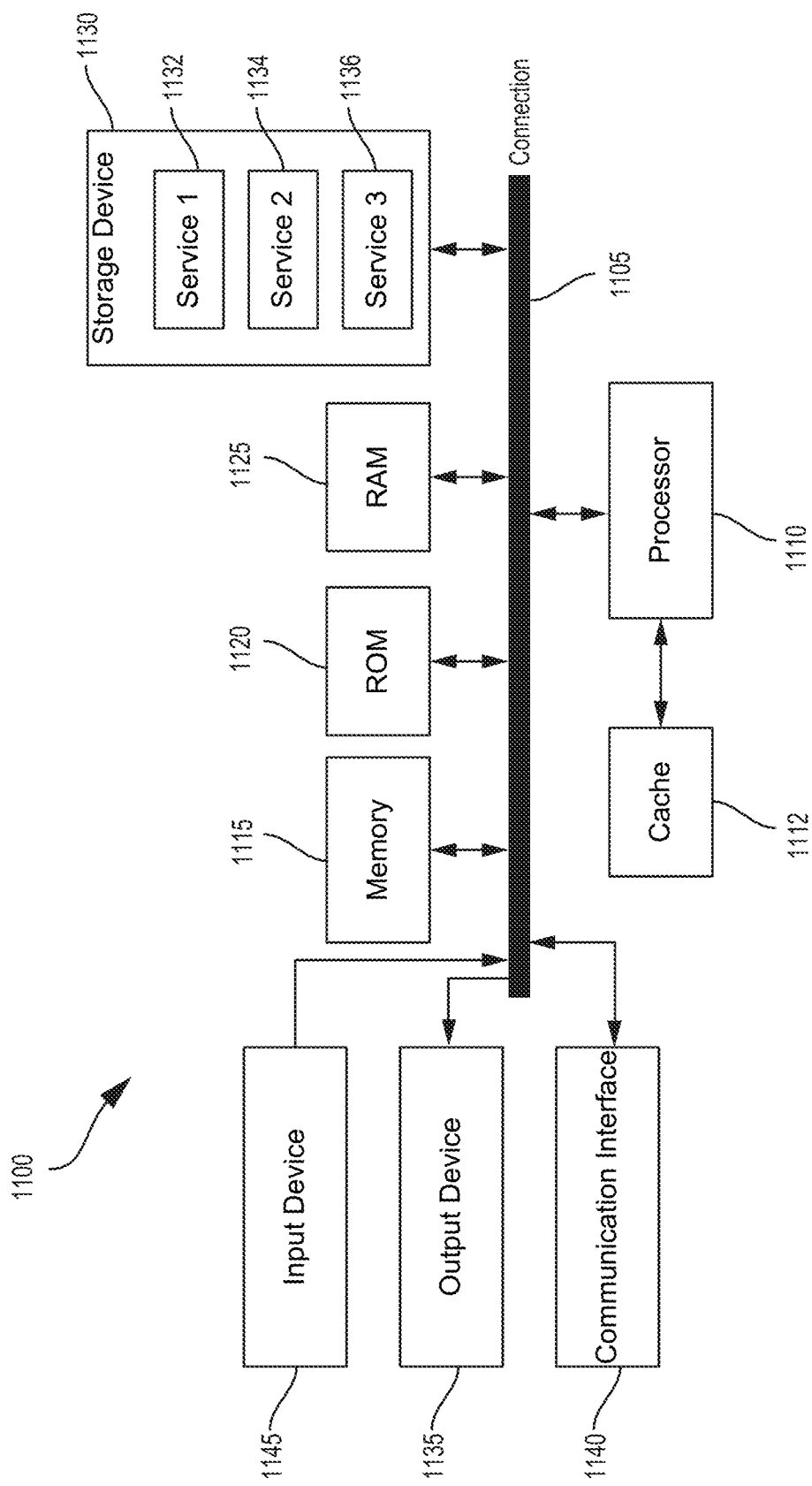
FIG. 11 is a block diagram illustrating an example of a computing system for implementing certain aspects described herein.

FIG. 11 illustrates an example computing device architecture 1100 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1100 are shown in electrical communication with each other using connection 1105, such as a bus. The example computing device architecture 1100 includes a processing unit (CPU or processor) 1110 and computing device connection 1105 that couples various computing device components including computing device memory 1115, such as read only memory (ROM) 1120 and random-access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In this way, the cache can provide a performance boost that avoids processor 1110 delays while waiting for data. These and other engines can control or be configured to control processor 1110 to perform various actions. Other computing device memory 1115 may be available for use as well. Memory 1115 can include multiple different types of memory with different performance characteristics. Processor 1110 can include any general-purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules or engines are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for performing Quasi-Zenith Satellite System (QZSS) signal acquisition, the method comprising: obtaining a modulated message signal using a frequency band; generating, based on an estimated set of signal acquisition parameters associated with an acquired signal, an energy grid of correlation codes; generating a series of extracted data bytes for each respective hypothesis of a plurality of hypotheses, the plurality of hypotheses generated based on a location of a peak energy within the energy grid of correlation codes; determining a correct hypothesis out of the plurality of hypotheses, wherein the correct hypothesis is associated with a generated series of extracted data bytes that includes a pre-determined header preamble pattern; and decoding the modulated message signal using an initial code phase associated with the correct hypothesis.

Aspect 2: The method of Aspect 1, wherein the modulated message signal includes a modulated L6 message signal and the frequency band is an L6 frequency band.

Aspect 3: The method of any of Aspects 1 to 2, wherein each respective hypothesis is associated with a different data byte value that may be encoded in an initial portion of the modulated message signal.

Aspect 4: The method of Aspect 3, further comprising: determining an initial code phase for each respective hypothesis based on the peak energy within the energy grid and a respective data byte value associated with each respective hypothesis.

Aspect 5: The method of Aspect 4, wherein generating the series of extracted data bytes for each respective hypothesis comprises: decoding an initial portion of the modulated message signal using the initial code phase determined for each respective hypothesis.

Aspect 6: The method of any of Aspects 1 to 5, wherein: the modulated message signal is a Quasi-Zenith Satellite System (QZSS) L6 message signal; and the pre-determined header preamble pattern is a QZSS L6 message header.

Aspect 7: The method of any of Aspects 1 to 6, wherein the modulated message signal is decoded based on one or more of the initial code phase associated with the correct hypothesis and an initial data byte value associated with the correct hypothesis.

Aspect 8: The method of any of Aspects 1 to 7, wherein the estimated set of signal acquisition parameters includes an estimated Doppler frequency and an estimated initial code phase associated with the acquired signal.

Aspect 9: The method of Aspect 8, wherein: generating the energy grid of correlation codes is further based an initial portion of the modulated message signal; and generating the energy grid of correlation codes includes dividing the initial portion of the modulated message signal into a plurality of frequency bins around the estimated Doppler frequency.

Aspect 10: The method of Aspect 9, wherein the location of the peak energy within the energy grid is a location of a correlation code generated based on the initial portion of the modulated message signal.

Aspect 11: The method of any of Aspects 1 to 10, wherein each respective hypothesis is associated with a different position of a code boundary between an initial portion of the modulated message signal and a remaining portion of the modulated message signal.

Aspect 12: The method of any of Aspects 2 to 11, wherein the acquired signal is a Global Positioning System (GPS) L1 signal acquired using an L1 frequency band.

Aspect 13: The method of Aspect 12, wherein determining the estimated set of signal acquisition parameters comprises: determining an estimated Doppler frequency associated with the modulated L6 message signal, based on steering a Doppler frequency associated with the GPS L1 signal from the L1 frequency band to the L6 frequency band; and determining an estimated initial code phase associated with the modulated L6 message signal, based on steering a code phase associated with the GPS L1 signal from the L1 frequency band to the L6 frequency band.

Aspect 14: The method of any of Aspects 1 to 13, wherein: the modulated message signal is a modulated L6 message signal obtained on an L6 frequency band; and the modulated message signal and the acquired signal are the same.

Aspect 15: The method of Aspect 14, wherein determining the estimated set of signal acquisition parameters comprises: determining a coarse estimation of a Doppler frequency associated with the modulated L6 message signal; and determining a coarse estimation of an initial code phase associated with the modulated L6 message signal.

Aspect 16: An apparatus for performing Quasi-Zenith Satellite System (QZSS) signal acquisition, the apparatus comprising: at least one memory; and at least one processor coupled to the at least one memory, the at least one processor configured to: obtain a modulated message signal using a frequency band; generate, based on an estimated set of signal acquisition parameters associated with an acquired signal, an energy grid of correlation codes; generate a series of extracted data bytes for each respective hypothesis of a plurality of hypotheses, the plurality of hypotheses generated based on a location of a peak energy within the energy grid of correlation codes; determine a correct hypothesis out of the plurality of hypotheses, wherein the correct hypothesis is associated with a generated series of extracted data bytes that includes a pre-determined header preamble pattern; and decode the modulated message signal using an initial code phase associated with the correct hypothesis.

Aspect 17: The apparatus of Aspect 16, wherein the modulated message signal includes a modulated L6 message signal and the frequency band is an L6 frequency band.

Aspect 18: The apparatus of any of Aspects 16 to 17, wherein each respective hypothesis is associated with a different data byte value that may be encoded in an initial portion of the modulated message signal.

Aspect 19: The apparatus of Aspect 18, wherein the at least one processor is configured to: determine an initial code phase for each respective hypothesis based on the peak energy within the energy grid and a respective data byte value associated with each respective hypothesis.

Aspect 20: The apparatus of Aspect 19, wherein, to generate the series of extracted data bytes for each respective hypothesis, the at least one processor is configured to: decode an initial portion of the modulated message signal using the initial code phase determined for each respective hypothesis.

Aspect 21: The apparatus of any of Aspects 16 to 20, wherein: the modulated message signal is a Quasi-Zenith Satellite System (QZSS) L6 message signal; and the pre-determined header preamble pattern is a QZSS L6 message header.

Aspect 22: The apparatus of any of Aspects 16 to 21, wherein the at least one processor is configured to decode the modulated message signal based on one or more of the initial code phase associated with the correct hypothesis and an initial data byte value associated with the correct hypothesis.

Aspect 23: The apparatus of any of Aspects 16 to 22, wherein the estimated set of signal acquisition parameters includes an estimated Doppler frequency and an estimated initial code phase associated with the acquired signal.

Aspect 24: The apparatus of Aspect 23, wherein the at least one processor is configured to: generate the energy grid of correlation codes further based an initial portion of the modulated message signal; and generate the energy grid of correlation codes based on dividing the initial portion of the modulated message signal into a plurality of frequency bins around the estimated Doppler frequency.

Aspect 25: The apparatus of Aspect 24, wherein the location of the peak energy within the energy grid is a location of a correlation code generated based on the initial portion of the modulated message signal.

Aspect 26: The apparatus of any of Aspects 16 to 25, wherein each respective hypothesis is associated with a different position of a code boundary between an initial portion of the modulated message signal and a remaining portion of the modulated message signal.

Aspect 27: The apparatus of any of Aspects 17 to 26, wherein the acquired signal is a Global Positioning System (GPS) L1 signal acquired using an L1 frequency band.

Aspect 28: The apparatus of Aspect 27, wherein, to determine the estimated set of signal acquisition parameter, the at least one processor is configured to: determine an estimated Doppler frequency associated with the modulated L6 message signal, based on steering a Doppler frequency associated with the GPS L1 signal from the L1 frequency band to the L6 frequency band; and determine an estimated initial code phase associated with the modulated L6 message signal, based on steering a code phase associated with the GPS L1 signal from the L1 frequency band to the L6 frequency band.

Aspect 29: The apparatus of any of Aspects 16 to 28, wherein: the modulated message signal is a modulated L6 message signal obtained on an L6 frequency band; and the modulated message signal and the acquired signal are the same.

Aspect 30: The apparatus of Aspect 29, wherein, to determine the estimated set of signal acquisition parameter, the at least one processor is configured to: determine a coarse estimation of a Doppler frequency associated with the modulated L6 message signal; and determine a coarse estimation of an initial code phase associated with the modulated L6 message signal.

Aspect 31: The apparatus of any of Aspects 16 to 30, wherein the apparatus is configured as a user equipment (UE), and further comprising: at least one transceiver configured to obtain the modulated message signal.

Aspect 32: At least one non-transitory computer-readable medium containing instructions which, when executed by one or more processors, cause the one or more processors to perform operations according to any of Aspects 1 to 31.

Aspect 33: An apparatus comprising means for performing operations according to any of Aspects 1 to 31.

What is claimed is:

1. A method for performing Quasi-Zenith Satellite System (QZSS) signal acquisition, the method comprising:
   obtaining a modulated message signal using a frequency band, wherein the modulated message signal is not associated with a pilot signal and corresponds to a plurality of modulated data bytes;
   generating, based on an estimated set of signal acquisition parameters associated with an acquired signal, an energy grid of correlation codes;
   generating a plurality of hypotheses for a value of an initial data byte encoded in the modulated message signal, the initial data byte included in the plurality of modulated data bytes, and wherein each respective hypothesis of the plurality of hypotheses corresponds to a different data byte value of a plurality of possible data byte values for the initial data byte;
   determining an initial code phase value for each respective hypothesis, based on a location of a peak energy within the energy grid and the different data byte value corresponding to each respective hypothesis, wherein each respective hypothesis is associated with a different initial code phase value and a different code boundary between respective modulated data bytes of the plurality of modulated data bytes;

generating, for each respective hypothesis, a corresponding series of extracted data bytes generated from the modulated message signal based on the different initial code phase value and the different code boundary for each respective hypothesis, wherein the corresponding series of extracted data bytes for each respective hypothesis includes a number of bytes equal to a number of bytes included in the plurality of modulated data bytes corresponding the modulated message signal;

determining a correct hypothesis out of the plurality of hypotheses, wherein the correct hypothesis is determined from the plurality of hypotheses based on the corresponding series of extracted data bytes associated with the correct hypothesis including a pre-determined header preamble pattern of four data byte values; and decoding the modulated message signal using the initial code phase value associated with the correct hypothesis.

2. The method of claim 1, wherein the modulated message signal includes a modulated L6 message signal and the frequency band is an L6 frequency band.

3. The method of claim 1, wherein the different data byte value associated with each respective hypothesis is a data byte value that may be encoded in an initial portion of the modulated message signal.

4. The method of claim 3, further comprising:
determining, for each respective hypothesis, the different code boundary, wherein the different code boundary is determined based on the initial code phase value for each respective hypothesis based on the peak energy within the energy grid and a respective data byte value associated with each respective hypothesis.

5. The method of claim 4, wherein generating the corresponding series of extracted data bytes for each respective hypothesis comprises:
decoding an initial portion of the modulated message signal using the different initial code phase value and the different code boundary between modulation bytes determined for each respective hypothesis.

6. The method of claim 1, wherein:
the modulated message signal is a Quasi-Zenith Satellite System (QZSS) L6 message signal; and
the pre-determined header preamble pattern is a QZSS L6 message header.

7. The method of claim 1, wherein the modulated message signal is decoded based on one or more of the initial code phase value associated with the correct hypothesis and an initial data byte value associated with the correct hypothesis.

8. The method of claim 1, wherein the estimated set of signal acquisition parameters includes an estimated Doppler frequency and an estimated initial code phase associated with the acquired signal.

9. The method of claim 8, wherein:
generating the energy grid of correlation codes is further based an initial portion of the modulated message signal; and
generating the energy grid of correlation codes includes dividing the initial portion of the modulated message signal into a plurality of frequency bins around the estimated Doppler frequency.

10. The method of claim 9, wherein the location of the peak energy within the energy grid is a location of a correlation code generated based on the initial portion of the modulated message signal.

11. The method of claim 1, wherein each respective hypothesis is associated with a different position of a code boundary between an initial portion of the modulated message signal and a remaining portion of the modulated message signal.

12. The method of claim 2, wherein the acquired signal is a Global Positioning System (GPS) L1 signal acquired using an L1 frequency band.

13. The method of claim 12, wherein determining the estimated set of signal acquisition parameters comprises:
determining an estimated Doppler frequency associated with the modulated L6 message signal, based on steering a Doppler frequency associated with the GPS L1 signal from the L1 frequency band to the L6 frequency band; and
determining an estimated initial code phase associated with the modulated L6 message signal, based on steering a code phase associated with the GPS L1 signal from the L1 frequency band to the L6 frequency band.

14. The method of claim 1, wherein:
the modulated message signal is a modulated L6 message signal obtained on an L6 frequency band; and
the modulated message signal and the acquired signal are the same.

15. The method of claim 14, wherein determining the estimated set of signal acquisition parameters comprises:
determining a coarse estimation of a Doppler frequency associated with the modulated L6 message signal; and
determining a coarse estimation of an initial code phase associated with the modulated L6 message signal.

16. An apparatus for performing Quasi-Zenith Satellite System (QZSS) signal acquisition, the apparatus comprising:
at least one memory; and
at least one processor coupled to the at least one memory, the at least one processor configured to:
obtain a modulated message signal using a frequency band, wherein the modulated message signal is not associated with a pilot signal and corresponds to a plurality of modulated data byte;
generate, based on an estimated set of signal acquisition parameters associated with an acquired signal, an energy grid of correlation codes;
generate a plurality of hypotheses for a value of an initial data byte encoded in the modulated message signal, the initial data byte included in the plurality of modulated data bytes, and wherein each respective hypothesis of the plurality of hypotheses corresponds to a different data byte value of a plurality of possible data byte values for the initial data byte;
determine an initial code phase value for each respective hypothesis, based on a location of a peak energy within the energy grid and the different data byte value corresponding to each respective hypothesis, wherein each respective hypothesis is associated with a different initial code phase value and a different code boundary between respective modulated data bytes of the plurality of modulated data bytes;
generate, for each respective hypothesis, a corresponding series of extracted data bytes generated from the modulated message signal based on the different initial code phase value and the different code boundary for each respective hypothesis, wherein the corresponding series of extracted data bytes for each respective hypothesis includes a number of bytes equal to a number of bytes included in the plurality of modulated data bytes corresponding the modulated message signal;

determine a correct hypothesis out of the plurality of hypotheses, wherein the correct hypothesis is determined from the plurality of hypotheses based on the corresponding series of extracted data bytes associated with the correct hypothesis including a pre-determined header preamble pattern of four data byte values; and decode the modulated message signal using the initial code phase value associated with the correct hypothesis.

17. The apparatus of claim 16, wherein the modulated message signal includes a modulated L6 message signal and the frequency band is an L6 frequency band.

18. The apparatus of claim 16, wherein the different data byte value associated with each respective hypothesis is a data byte value that may be encoded in an initial portion of the modulated message signal.

19. The apparatus of claim 18, wherein the at least one processor is configured to:

determine, for each respective hypothesis, the different code boundary, wherein the different code boundary is determined based on the initial code phase value for each respective hypothesis based on the peak energy within the energy grid and a respective data byte value associated with each respective hypothesis.

20. The apparatus of claim 19, wherein, to generate the corresponding series of extracted data bytes for each respective hypothesis, the at least one processor is configured to:

decode an initial portion of the modulated message signal using the different initial code phase value and the different code boundary between modulation bytes determined for each respective hypothesis.

21. The apparatus of claim 16, wherein:

the modulated message signal is a Quasi-Zenith Satellite System (QZSS) L6 message signal; and the pre-determined header preamble pattern is a QZSS L6 message header.

22. The apparatus of claim 16, wherein the at least one processor is configured to decode the modulated message signal based on one or more of the initial code phase value associated with the correct hypothesis and an initial data byte value associated with the correct hypothesis.

23. The apparatus of claim 16, wherein the estimated set of signal acquisition parameters includes an estimated Doppler frequency and an estimated initial code phase associated with the acquired signal.

24. The apparatus of claim 23, wherein the at least one processor is configured to:

generate the energy grid of correlation codes further based an initial portion of the modulated message signal; and generate the energy grid of correlation codes based on dividing the initial portion of the modulated message signal into a plurality of frequency bins around the estimated Doppler frequency.

25. The apparatus of claim 24, wherein the location of the peak energy within the energy grid is a location of a correlation code generated based on the initial portion of the modulated message signal.

26. The apparatus of claim 16, wherein each respective hypothesis is associated with a different position of a code boundary between an initial portion of the modulated message signal and a remaining portion of the modulated message signal.

27. The apparatus of claim 17, wherein the acquired signal is a Global Positioning System (GPS) L1 signal acquired using an L1 frequency band.

28. The apparatus of claim 27, wherein, to determine the estimated set of signal acquisition parameters, the at least one processor is configured to:

determine an estimated Doppler frequency associated with the modulated L6 message signal, based on steering a Doppler frequency associated with the GPS L1 signal from the L1 frequency band to the L6 frequency band; and determine an estimated initial code phase associated with the modulated L6 message signal, based on steering a code phase associated with the GPS L1 signal from the L1 frequency band to the L6 frequency band.

29. The apparatus of claim 16, wherein:

the modulated message signal is a modulated L6 message signal obtained on an L6 frequency band; and the modulated message signal and the acquired signal are the same.

30. The apparatus of claim 29, wherein, to determine the estimated set of signal acquisition parameters, the at least one processor is configured to:

determine a coarse estimation of a Doppler frequency associated with the modulated L6 message signal; and determine a coarse estimation of an initial code phase associated with the modulated L6 message signal.

* * * * *